US008056732B2

(12) United States Patent
McKeown et al.

(10) Patent No.: US 8,056,732 B2
(45) **Date of Patent: *Nov. 15, 2011**

(54) MICROPOROUS POLYMER MATERIAL

(75) Inventors: Neil B. McKeown, Gilwern (GB); Peter M. Budd, Cheadle Hulme (GB); Kadhum Msayib, Chorlton (GB); Bader Ghanem, Cardiff (GB)

(73) Assignee: The University of Manchester, Manchester (GB)

( * ) Notice: Subject to any disclaimer, the term of this patent is extended or adjusted under 35 U.S.C. 154(b) by 0 days.

This patent is subject to a terminal disclaimer.

(21) Appl. No.: 12/709,259

(22) Filed: Feb. 19, 2010

(65) Prior Publication Data

US 2010/0304112 A1 Dec. 2, 2010

Related U.S. Application Data

(63) Continuation of application No. 10/565,961, filed as application No. PCT/GB2004/003166 on Jul. 22, 2004, now Pat. No. 7,690,514.

(30) Foreign Application Priority Data

Jul. 26, 2003 (GB) .................................. 0317557.7

(51) Int. Cl.
*B01D 71/06* (2006.01)
*B01D 71/00* (2006.01)
*B01D 61/00* (2006.01)

(52) U.S. Cl. ......... 210/500.22; 210/500.27; 210/500.21; 210/500.28; 428/314.8; 428/315.5; 502/100; 502/402

(58) Field of Classification Search ....................... None
See application file for complete search history.

(56) References Cited

FOREIGN PATENT DOCUMENTS

WO WO 03/000774 1/2003

OTHER PUBLICATIONS

International Search Report for PCT/GB2004/003166 dated Sep. 12, 2005.
McKeown et al., *Phthalocyanine-based nanoporous network polymers*, Chem. Commun., 2002, pp. 2780-2781, XP002342917.
McKeown et al., "Porphyrin-based nanoporous network polymers", Chem. Commun., 2002, pp. 2782-2783, XP002342978.
Tsyurupa and Davankov, "Hypercrosslinked polymers: basic principle of preparing the new class of polymer materials.", Reactive & Functional Polymers 53:193-203 (2002).
McKeown et al., Phthalocyanine-based nanoporous network polymers, Chem. Commun., web-published Oct. 2002.
McKeown et al., Microporous polymeric materials, Materials Today (Apr. 2004).

*Primary Examiner* — Krishnan S Menon
(74) *Attorney, Agent, or Firm* — Nixon & Vanderhye P.C.

(57) ABSTRACT

The present invention relates to a microporous material which is a non-network polymer having a chain comprised of repeating units bonded to each other and each including a first generally planar species and a rigid linker, the linker having a point of contortion such that two adjacent first planar species connected by a rigid linker are held in a non-coplanar orientation, the rigid linker further being such that the polymer chain has a rigid contorted structure, and the polymer being such that said repeating units comprised of the first generally planar species and the rigid linker are bonded predominately to two other such repeating units.

30 Claims, 6 Drawing Sheets

MICROPOROUS POLYMER MATERIAL

This application is a continuation of application Ser. No. 10/565,961, filed Jan. 26, 2006, now U.S. Pat. No. 7,690,514 which is the U.S. national phase of International Application No. PCT/GB2004/003166, filed Jul. 22, 2004, which designates the U.S. and claims priority from GB 0317557.7 filed Jul. 26, 2003, the entire contents of which are incorporated herein by reference.

The present invention relates to organic microporous materials and more particularly, but not exclusively, to such materials which by virtue of their high surface area have applications as purification, separation, adsorption and reactive membranes.

Throughout the present application the term 'microporous materials' is intended to encompass materials which may also be described as 'nanoporous materials'.

There are two main classes of intrinsic microporous materials widely used in industry—these are the zeolites and amorphous, activated carbons. Such materials are of great technological importance in chemical separations, heterogeneous catalysis and as adsorbents due to their high surface areas (typically 500-1200 $m^2 g^{-1}$). The zeolites and related materials possess ordered, crystalline lattices and the shape and size of the micropores can be selected to suit the intended application. In contrast, activated carbons are ill-defined both in terms of structure and surface chemistry. Unfortunately, the scope for catalysis, separation and adsorption offered by these conventional microporous materials is limited by the nature of the exposed surface and their insolubility in common organic solvents, such as THF and chloroform—a property that hinders the fabrication of thin films and membranes. Consequently, there is a requirement for the development of readily processible organic materials, especially polymers, which demonstrate intrinsic porosity but for which the chemical nature of the exposed surface can be tailored to suit the end application.

To date, the advances towards the preparation of organic-based microporous structures have been modest. For example many research groups are studying organic materials composed of rigid molecules linked by non-covalent interactions such as metal-ligand or hydrogen bonding. These systems are well ordered and can be designed to possess pores in the size range 0.5-2 nm in diameter. However, the resulting structures are far too fragile for most applications—indeed most collapse when the solvent present during assembly is removed. For many such systems, the formation of large pores is prohibited by the interpenetration of one lattice within the pores of another. A different approach is the preparation of stable polymer networks composed of rigid segments such as triphenylcarbinols or 1,3,5-linked phenylenes. The presence of small voids in these materials was inferred by the absorption of argon. However, until recently rigid polymer networks have not provided large surface areas.

Rigid polymer networks having large surface areas have been disclosed in WO-A-2002/002838 (The Victoria University of Manchester) which describes "organic-based" microporous materials comprised of a 3-dimensional network of planar porphyrinic macrocycles covalently interconnected by linkers which impose a particular relative orientation on the macrocycle rings they interconnect. Each such linker may connect two or more of the macrocyclic rings together and in the overall network the substantial majority (but not necessarily all) of the macrocyclic rings is associated with at least three, and ideally four, linkers each of which in turn links that macrocycle to at least one adjacent macrocycle so as to build up the overall 3-dimensional network. Due to their flat, plate-like (or cross-like) shape, the non-coplanar orientation of the planes of adjacent macrocycles ensures a microporous structure. The rigid linkers maintain the non-coplanarity of the planes of adjacent macrocycles that would otherwise allow the coalescence of macrocycles and thus collapse the desired void space within the material. While these materials represent an important advance in this area of technology and should find application in a number of different fields they suffer from the disadvantage of being relatively insoluble in many common organic solvents, such as THF, DMF and dichloromethane, which may restrict the ease with which they can be processed, e.g. into membranes.

Non-crystalline (i.e. amorphous or 'glassy') polymers as used for forming membranes usually contain some void space—usually termed free volume ($V_f$). This is typically less that 5% of the total volume for conventional glassy polymers. However for those with rigid molecular structures, it is possible to 'freeze-in' additional free volume by rapid cooling of the molten state below the glass transition temperature. Alternatively, free volume can be introduced by the removal of a sorbate or solvent from a swollen glassy polymer. In this way, free volume of up to 20% can be achieved and high free volume polymers (e.g. polyimides, polyphenyleneoxides, polysulphones) are used for semi-permeable membranes due to the free volume assisting the transport of gas or liquid across the material. Many industrial processes such as gas separation and water purification are based on such membranes.

Nitrogen adsorption is only rarely used as a method of assessing and defining the microporosity of such polymers—in contrast to its widespread use for the characterisation of conventional microporous materials (e.g. zeolites and carbons). In fact, only one research group has investigated in detail the surface area of high-free volume polymers using this technique (see *Polymer,* 2002, 43, 3209). They found that a derivative of poly(phenyleneoxy)—a promising membrane material—shows only a low surface area (30 $m^2 g^{-1}$) but that this could be dramatically increased to approximately 400 $m^2 g^{-1}$ by treatment with propylene. However, this induced microporosity is lost on aging (or heating) to give a material of low surface area.

The class of polymers best exemplified by poly(1-trimethylsilyl-1-propyne), also known as PTMSP or poly(TMSP), may fulfil the criteria of intrinsic microporosity, i.e. microporosity that is derived from the molecular structures of the polymer rather than introducing the interconnecting pores by means of processing or a 'templated' preparation within a colloidal system. Masuda first described PTMSP in 1983 (see Journal of the American Chemical Society, 1983, 105, 7473) and since that time there have been approximately 550 papers and patents relating to this polyacetylene and those with a closely related structure. This work has been reviewed recently in *Progress in Polymer Science* (2001, 26, 7221). The reason for the intense interest in PTMSP is due to its extremely high gas permeabilities (e.g. for oxygen and hydrocarbons), which are 2-3 orders of magnitude higher than those displayed by other types of polymer. Numerous publications and patents describe the use of PTMSP-based membranes for gas separation, pervaporation, sensors and adsorbents (see comprehensive list of references in *Progress in Polymer Science,* 2001, 26, 7221). It is of interest to note that the surface area of PTMSP, as measured by nitrogen adsorption, has been reported as 550 $m^2 g^{-1}$ in a number of reviews but, as far as we can determine, the nitrogen adsorption isotherm on which this figure was based has never been shown in the open literature. Therefore, direct comparisons of the microporosity of PTMSP with other polymers are difficult. Nevertheless, PTMSP is described as a micro- or nano-porous polymer on the basis that the large amount of free volume it possesses (approximately 25-30%) is interconnected thus allowing the rapid diffusion of gas. The technological potential of PTMSP is clear, however, it has several serious drawbacks including rapid ageing—involving the loss of its high gas permeability—and lack of stability towards oxygen/radiation/UV light/heat or various combinations of these factors.

An object of the present invention is to obviate or mitigate the aforementioned disadvantages.

According to a first aspect of the present invention there is provided a microporous material comprising organic macromolecules comprised of first generally planar species connected by rigid linkers having a point of contortion such that two adjacent first planar species connected by the linker are held in non-coplanar orientation, subject to the proviso that the first species are other than porphyrinic macrocycles.

The first aspect of the present invention is based on the unexpected realisation that porphyrinic macrocycles are not essential for the formation of rigid 3-dimensional networks exhibiting intrinsic microporosity, such materials can in fact be produced using any suitable generally planar species connected by rigid linkers having a point of contortion. An important advantage of the present invention over the earlier porphyrin-containing microporous materials described in WO-A-2002/002838 is that many other components (e.g. hexaazatrinaphthylene) may be incorporated into the structure of the materials to provide different functionality (e.g. basic sites and sites for metal chelation).

Furthermore, since it has been recognised that a highly cross-linked polymer network is not essential in order to ensure microporosity, a second aspect of the present invention provides a microporous material comprising organic macromolecules comprised of first generally planar species connected by rigid linkers predominantly to a maximum of two other said first species, said rigid linkers having a point of contortion such that two adjacent first planar species connected by the linker are held in non-coplanar orientation.

The second aspect of the present invention provides materials possessing intrinsic microporosity. This material is comprised of organic macromolecules in which first generally planar species are connected predominantly to a maximum of two other said species by means of rigid linkers having a point of contortion which causes the two planar species connected by a linker to be held in non-coplanar orientation. By predominantly we mean that at least 50% by mole of the first planar species in the organic macromolecule are connected (by the rigid linkers) to a maximum of two other such first planar species. Preferably the macromolecules are such that at least 70%, more preferably at least 80%, and most preferably at least 90% by mole of the first planar species are connected (by the rigid linkers) to a maximum of two other planar species. In this way, materials can be produced which possess high surface areas but which are sufficiently soluble in common organic solvents to facilitate use in a wider range of applications than conventional microporous materials. Particularly preferred embodiments of this aspect of the invention are materials which comprise a plurality of contorted polymer chains in which adjacent chains are prevented from packing together efficiently by virtue of their rigid contorted structure which results in such materials possessing intrinsic microporosity. Thus, preferred inventive materials possess intrinsic microporosity extending in three dimensions but may be considered as 'non-network' polymer materials since they do not have a cross-linked covalently bonded 3-dimensional structure such as that possessed by the porphyrin-based materials disclosed in WO-A-2002/002838.

The surface area of the inventive materials as measured by nitrogen adsorption or a related technique may be at least 300 $m^2\ g^{-1}$ or at least 500 $m^2\ g^{-1}$. Furthermore, the surface area may be in the range 600 to 900 $m^2\ g^{-1}$ or 700 to 1500 $m^2\ g^{-1}$. It should be noted that the actual value is dependent upon the specific monomers used.

Further properties which it is desirable to control in order to provide useful microporous materials are pore diameter and number average mass, for example, as compared to polystyrene standards as measured by gel permeation chromatography. The inventive materials preferably have an average pore diameter of less than 100 nm and, more preferably, a pore diameter in the range 0.3 to 20 nm. Moreover, the inventive materials preferably have a number average mass (compared to polystyrene standards) in the range $1\times10^3$-$1000\times10^3$ amu, more preferably in the range $15\times10^3$-$500\times10^3$ amu. Furthermore, it is preferred that the inventive materials have a number average mass in the range $20\times10^3$-$200\times10^3$ amu.

Materials in accordance with the first or second aspect of the present invention may be produced by reacting suitable monomer units. A third aspect of the invention provides a method for producing the microporous materials according to the first or second aspect of the invention comprising reacting a first monomer unit having a point of contortion with a pair of second generally planar monomer units.

The microporous materials of the present invention are eminently suitable for use as membranes, particularly purification, separation, adsorption and reactive membranes. Therefore according to a fourth aspect of the present invention there is provided a membrane comprising a microporous material according to the first or second aspect of the invention.

The organic nature of the inventive materials enables the pore structure of membranes constructed from such materials to be functionalised to a high degree of specificity for a particular species over similar species. For example, by careful selection of monomers, materials possessing pores having chiral inner surfaces can be produced which may be useful in separation processes involving chiral molecules, such as amino acids.

Membranes in accordance with the fourth aspect of the present invention may be of a form selected from the group consisting of: a pressed powder; a collection of fibres; a compressed pellet; a composite comprised of a plurality of individual membrane layers; a free standing film; and a supported film.

Preferably the inventive membrane in accordance with the fourth aspect of the invention has a thickness which is less than or equal to 2 mm, and more preferably less than or equal to 1 mm. The membrane may have a thickness which is in the range 1 μm to 500 μm, 50 to 500 μm, or 150 to 350 μm. Additionally, the thickness of the membrane may be in the range 10 μm to 100 μm. It is envisaged that thinner membranes may be particularly suitable for use in pervaporation processes.

In certain applications it will be of use to construct membranes which comprise additional entities designed to perform a specific task. Thus, membranes in accordance with the fourth aspect of the invention may include an additional entity selected from a catalyst species, an organometallic species, an inorganic species, at least one type of metal ion; and at least one type of metal particle. The additive may for example be a metal-containing organic catalyst such as a phthalocyanine or porphyrin. A preferred example of an inorganic species is a zeolite.

Free standing or supported membranes in accordance with the invention may be produced by solvent casting techniques.

Thus according to a fifth aspect of the invention there is provided a method for producing a free-standing membrane in accordance with the fourth aspect of the invention, the method comprising the steps of: i) casting a solution of the microporous material of which the membrane is comprised; and ii) evaporating the solvent to produce the membrane. Furthermore, a sixth aspect of the invention provides a method for producing a supported membrane in accordance with the fourth aspect of the invention, the method comprising the steps of: i) casting a solution of the microporous material of which the membrane is comprised onto a suitable support; and ii) evaporating the solvent to produce the membrane. The support may be a macroporous inorganic or polymeric support. Additionally, membranes produced in accordance with the fifth or sixth aspects of the invention may be cross-linked using a suitable cross-linking agent, such as palladium dichloride. Such cross-linking may render the membrane insoluble in organic solvents, which may be desirable in certain applications.

While many materials in accordance with the present invention are soluble in common organic solvents, some are not. Such insoluble materials may be formed in to membranes using a range of conventional techniques such as powder pressing. Alternatively, insoluble inventive materials may be mixed with a soluble microporous material (which may or may not be in accordance with the present invention) so that the mixture can then be processed using any of the known techniques employed for fabricating membranes from soluble materials e.g. solvent casting.

The intrinsic microporosity of the inventive materials is distinct from the microporosity induced within conventional glassy polymers in that it is not eliminated by aging (i.e. physical relaxation), annealing at elevated temperatures (e.g. between 100° C. and 300° C.), or the slow removal of solvent during film or membrane fabrication.

According to a seventh aspect of the present invention there is provided a method for separating a first species from a mixture of said first species and a second species, the method comprising the steps of: i) applying the mixture to one side of a membrane in accordance with the fourth aspect of the invention; ii) causing the first species to pass through the membrane; and iii) collecting the first species from an opposite side of the membrane.

The term 'separating' in the method forming the seventh aspect of the invention is intended to encompass both 'separation' and 'removal' of a first species from a mixture of said first species and a second species.

The mixture of the first and second species may be in the gas or vapour phase, or alternatively, in the liquid phase.

The inventive membranes may also be used to enrich a particular component in a mixture of that component with at least one further component. Accordingly, an eighth aspect of the present invention provides a method for enriching a first species in a first mixture of said first species and a second species, the method comprising the steps of: i) applying the first mixture to one side of a membrane in accordance with the fourth aspect of the invention; ii) causing the first mixture to pass through the membrane; and iii) collecting a second mixture of the first and second species, which is enriched in respect of the first species compared to the first mixture, from an opposite side of the membrane.

The first mixture may be in the gas or vapour phase, or the first mixture may be in the liquid phase.

It will be clear to the skilled person that the method in accordance with the seventh aspect of the invention is eminently suitable for the separation (or removal) of a first species from a mixture of said first species and at least two further species. Similarly, the method forming the eighth aspect of the invention is eminently suitable for the enrichment of a first species in a mixture of said first species and at least two further species.

Regarding the seventh and eighth aspects of the invention, preferably at least one of the first and second species is an organic compound. In one preferred embodiment the first species is an organic compound and the second species is water. The organic compound may be an alcohol or a halogenated hydrocarbon compound. In a further preferred embodiment the first and second species are organic compounds and the first species is an isomer of the second species. In this case, at least one of said organic compounds may be an alcohol or a metal-containing compound.

Membrane separation is based primarily on the relative rates of mass transfer of different species across a membrane. A driving force, typically a pressure or a concentration difference, is applied across the membrane so that selected species preferentially pass across the membrane.

The inventive materials are especially suitable to be formed in to membranes and more particularly into membranes which may be used for purification, separation or adsorption of a particular species in the liquid or gas phase. The inventive membranes may, for example, be used for the separation of proteins or other thermally unstable compounds, e.g. in the pharmaceutical and biotechnology industries. The membranes may also be used in fermentors and bioreactors to transport gases into the reaction vessel and transfer cell culture medium out of the vessel. Additionally, the membranes may be used for the removal of microorganisms from air or water streams, water purification, ethanol production in a continuous fermentation/membrane pervaporation system, and detection or removal of trace compounds or metal salts in air or water streams.

The inventive membranes may be used in gas/vapour separation processes in chemical, petrochemical, pharmaceutical and allied industries for removing organic vapours from gas streams, e.g. in off-gas treatment for recovery of volatile organic compounds to meet clean air regulations, or within process streams in production plants so that valuable compounds (e.g., vinylchloride monomer, propylene) may be recovered. Further examples of gas/vapour separation processes in which the inventive materials may be used are hydrocarbon vapour separation from $H_2$ in oil and gas refineries, for hydrocarbon dewpointing of natural gas (i.e. to decrease the hydrocarbon dewpoint to below the lowest possible export pipeline temperature so that liquid hydrocarbons do not separate in the pipeline), for control of methane number in fuel gas for gas engines and gas turbines, and for gasoline recovery. It is possible for the membranes of the invention to incorporate a species that adsorb strongly to certain gases (eg cobalt porphyrins or phthalocyanines for $O_2$ or silver(I) for ethane) to facilitate their transport across the membrane.

The inventive membranes may also be used in the separation of liquid mixtures by pervaporation, such as in the removal of organic compounds (e.g., alcohols, phenols, chlorinated hydrocarbons, pyridines, ketones) from water such as aqueous effluents or process fluids. A membrane in accordance with invention which is ethanol-selective would be useful for increasing the ethanol concentration in relatively dilute ethanol solutions (5-10% ethanol) obtained by fermentation processes. Further liquid phase examples include the separation of one organic component from another organic component, e.g. to separate isomers of organic compounds. Mixtures of organic compounds which may be separated using an inventive membrane include: ethylacetate-ethanol, diethylether-ethanol, acetic acid-ethanol, benzene-ethanol, chloroform-ethanol, chloroform-methanol, acetone-ispropylether, allylalcohol-allyl ether, allylalcohol-cyclohexane, butanol-butylacetate, butanol-1-butylether, ethanol-ethylbutylether, propylacetate-propanol, isopropylether-isopropanol, methanol-ethanol-isopropanol, and ethylacetate-ethanol-acetic acid, as suggested by G. F. Tusel and H. E. A. Bruschke, (*Desalination,* 1985, 53, 327).

The membranes may be used for gas separation. Examples of such separation include separation of an organic gas from a ‘permanent’ gas, i.e. a small inorganic gas such as nitrogen or oxygen. A further example of such a separation is for the separation of organic gases from each other.

The membranes may be used for separation of organics from water (eg ethanol and/or phenol from water by pervaporation) and removal of metal and organic compounds from water.

An additional application for the inventive membranes is in chemical reactors to enhance the yield of equilibrium-limited reactions by selective removal of a specific product in an analogous fashion to the use of hydrophilic membranes to enhance esterification yield by the removal of water, (*J. Memb. Sci.,* 2002, 199, 117).

High surface area materials in accordance with the first or second aspect of the invention may be used in processes which conventionally employ zeolites or other inorganic nanoporous materials, for example chromatography, catalysis and separation processes based on selective gas/liquid adsorption. Further potential applications of the inventive materials include use as molecular scaffolds which may, for example, function as supports for catalysts or tissue samples, use as components in opto-electronic devices, sensors or to manufacture textile materials.

Accordingly, a ninth aspect of the present invention provides a catalyst system comprising a catalytic species and a microporous material in accordance with the first or second aspect of the invention.

The catalytic species may take any convenient form. For example, the catalytic species may be selected from the group consisting of: an acidic site; a basic site; a metal; and a metal salt.

An tenth aspect of the present invention provides a tissue support comprising a microporous material in accordance with the first or second aspect of the invention.

A eleventh aspect of the present invention provides a molecular sensor comprising a microporous material in accordance with the first or second aspect of the invention.

A twelfth aspect of the present invention provides an opto-electronic material comprising a microporous material in accordance with the first or second aspect of the invention. Preferably the opto-electronic material comprises an organic or inorganic electrically conducting material, such as a polymeric material or a material of low molar mass.

As indicated above, materials in accordance with the first and second aspects of the invention comprise first generally planar species connected by rigid linkers having a point of contortion such that that two adjacent first planar species connected by the linker are held in non-coplanar orientation. Preferably the point of contortion is a spiro group, a bridged ring moiety, or a sterically congested single covalent bond around which there is restricted rotation. The point of contortion may be provided by a substituted or unsubstituted spiro-indane, bicyclo-octane, biphenyl or binaphthyl moiety.

Each of the first planar species preferably comprises at least one aromatic ring. In a further preferred embodiment of the invention each of the first planar species comprises a substituted or unsubstituted moiety of the formula:

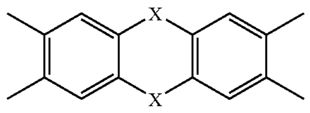

where X is O, S or NH.

Moreover, the inventive material may comprise repeating units of formula:

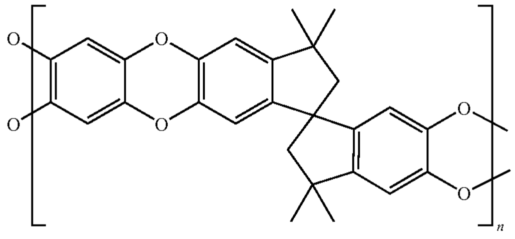

which may be substituted or unsubstituted.

Furthermore, the inventive material may comprise repeating units of formula:

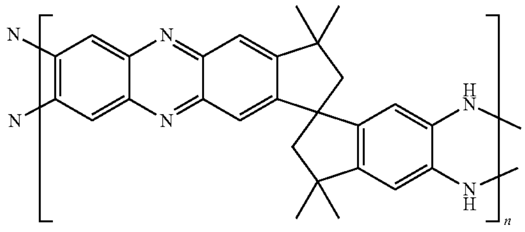

which may be substituted or unsubstituted.

The inventive materials can be prepared with the type of chemistry used for the preparation of high performance polymers from a large variety of suitable monomers without compromising the intrinsic microporosity. The robust chemical nature of the five and six-membered rings which dominate the structure of the inventive materials are similar to those chosen to construct high performance engineering materials and therefore promise improved chemical and physical stability as compared to PTMSP.

In a preferred embodiment, the invention provides a new class of microporous polymers, exemplified by polydioxane A (1), which offer similar (perhaps greater) microporosity than PTMSP due to their rigid and contorted molecular structure.

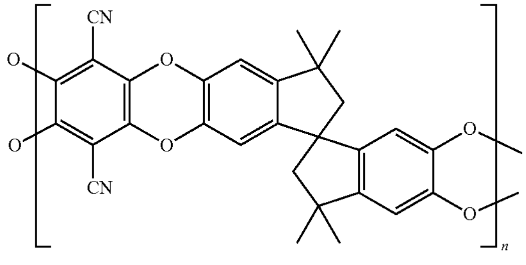

Polydioxane A (1)

The microporosity of polydioxane A (which represents a preferred embodiment of the present invention) is demonstrated by its high surface area (approximately 680-850 $m^2$ $g^{-1}$) determined using nitrogen adsorption measurements (BET calculation). The presence of the cyano and methyl groups is optional, they may be omitted or replaced with other simple substituents. Each phenyl group may contain one or more substituents. Additionally, the nature and arrangement of substituents on the spiro-indane moiety may be chosen to provide any desirable configuration around the carbon atom common to both 5-membered rings.

Polydioxane A may be prepared in good yield from the aromatic nucleophilic substitution reaction between a bis(catechol) (2) and tetrafluoroterephthalonitrile (3) as shown below in reaction scheme A:

Reaction scheme A: synthesis of polydioxane A(1);

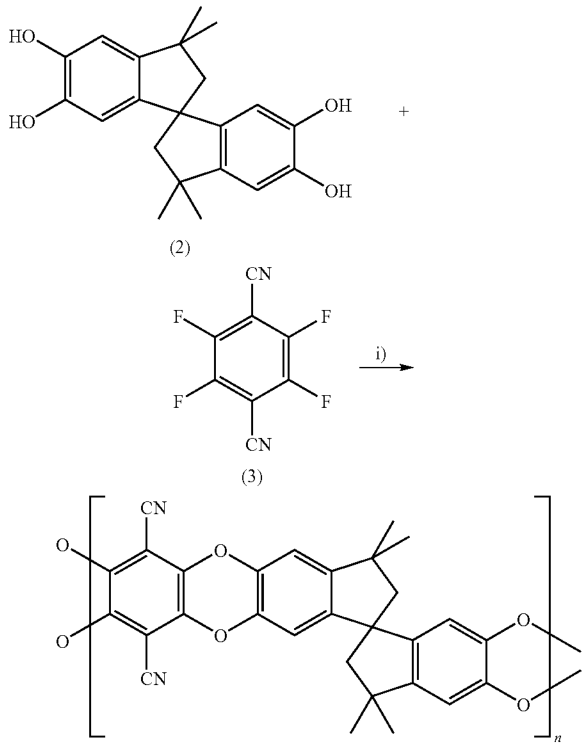

(2)

(3)

(1)

i) $K_2CO_3$, DMF, 50° C.

The resulting polymer, polydioxane A (1), is freely soluble in THF and DMF, partially soluble in chloroform and insoluble in acetone, methanol and water. By gel permeation chromatography, it has a number average mass of $170\times10^3$ amu as compared to polystyrene standards. In solution, as a powder and as a solvent cast membrane it is highly fluorescent (yellow). Most importantly, it displays a surface area in the range 680-850 $m^2$ $g^{-1}$ (measured from 10 different samples). Simple molecular modelling shows that polydioxane A (1) is forced to adopt a contorted configuration due to the presence of the spiro-indane centres, each of which acts as a 'point of contortion'. In addition, the fused ring structure ensures that the randomly contorted structure of each polymer molecule is locked so that the molecules cannot pack efficiently resulting in microporosity.

Further polymers with similarly rigid-and contorted structures to that of polydioxane A (1) can be produced. In essence, any combination of monomers, which a) leads to a very rigid polymer and b) gives a polymer within which there are sufficient structural features to induce a contorted structure leads to microporosity.

Within the new class of microporous polymers provided by the present invention are five preferred sub-classes of microporous materials, each of which is characterised by the monomer units from which the final materials are produced.

The first sub-class of materials includes polydioxane A (1). Materials falling in to this sub-class are produced from the reaction of a $Nu_2$-R-$Nu_2$ monomer and an $X_2$—R'—$X_2$ monomer. In each case, R and R' represent organic-based moieties linking the $Nu_2$ or $X_2$ groups. R and R' may or may not be the same moiety. Provided at least one of R and R' contains at least one point of contortion, the resulting polymer will possess intrinsic microporosity. R and/or R' may contain one or more point of contortion. In essence Nu represents a nucleophile and X represents a good leaving group for nucleophilic substitution, particularly aromatic nucleophilic substitution in cases where X is bonded to an aromatic group. Thus the reaction of $Nu_2$-R-$Nu_2$ with $X_2$—R'—$X_2$ involves a nucleophilic substitution reaction in which each Nu group bonds to a carbon atom bearing an X group and displaces X as exemplified below in idealised reaction scheme B.

Reaction scheme B

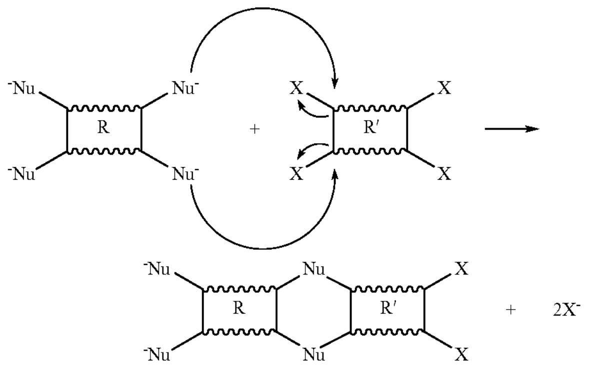

Scheme B illustrates a preferred embodiment of the invention in which the four nucleophilic groups (Nu) in each monomer compound are arranged in two pairs in which the members of each pair are bonded to adjacent carbon atoms. Moreover the four leaving groups (X) in each monomer compound are likewise arranged in two pairs in which the members of each pair are bonded to adjacent carbon atoms. Arranging the four Nu and X groups in this way results in a pair of covalent bonds being formed to give a six-membered ring of atoms between each pair of monomers containing two carbon atoms from each monomer. Consequently, rotation of one monomer unit, once incorporated into the polymer, relative to its neighbor is restricted which results in a polymer structure in which adjacent monomers units are essentially 'locked' together. Removing rotational freedom in this way provides greater control over the microporosity of materials formed using such an arrangement of Nu and X groups since the predetermined points of contortion built into the structure are the predominant factor ensuring the contorted shape of the polymer chains and thereby the microporosity of the resulting material.

Each Nu and X may or may not be the same type of functional group. Moreover, each B and X may be any particular functional group provided it satisfies the above requirements. In preferred embodiments of the present invention Nu is an OH, $NH_2$ or SH group and X is a halogen, OPh, OTs or triflate group.

Alternative embodiments of the invention are envisaged in which one monomer comprises suitably arranged nucleophilic groups which can react with suitably arranged leaving groups on another monomer so as to form a desired polymer. It will be clear to the skilled person that a point of contortion may be present in the R-group of the nucleophile-containing monomer and not in the R'-group of the leaving group-containing monomer or vice versa. Additionally, a point of contortion may be present in both types of monomers.

It is preferred that the point of contortion is present in the monomer bearing the nucleophilic groups and that the generally planar species carry the leaving groups.

Examples of $Nu_2$-R-$Nu_2$ compounds which include points of contortion are:

(2)

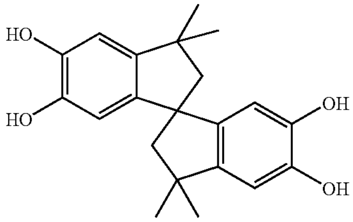

(4)

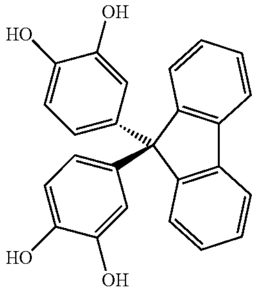

(5)

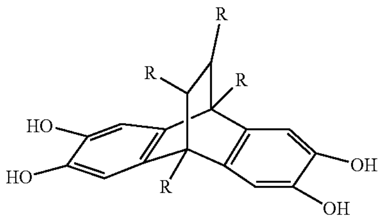

(6)

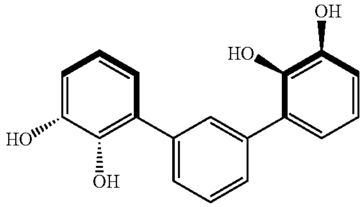

-continued (7)

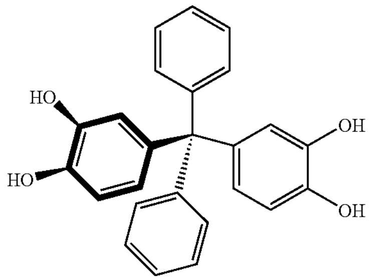

(8)

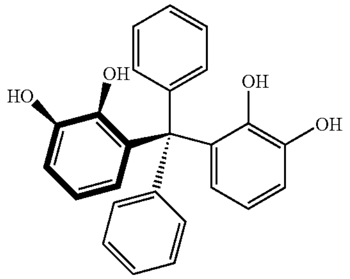

(9)

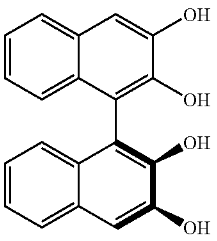

(10)

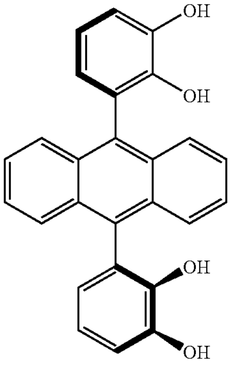

(11)

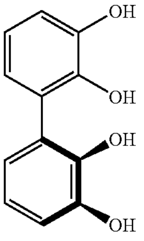

(12)

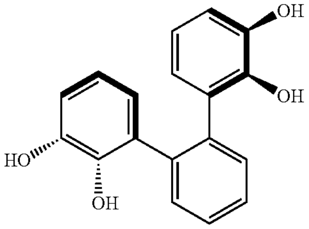

-continued (13)

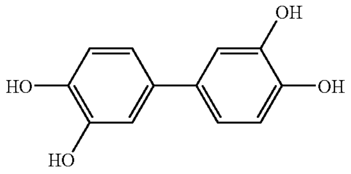

(14)

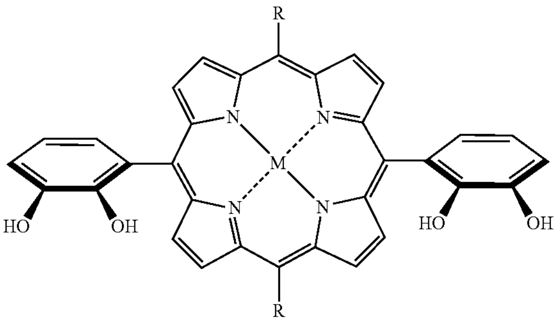

(15)

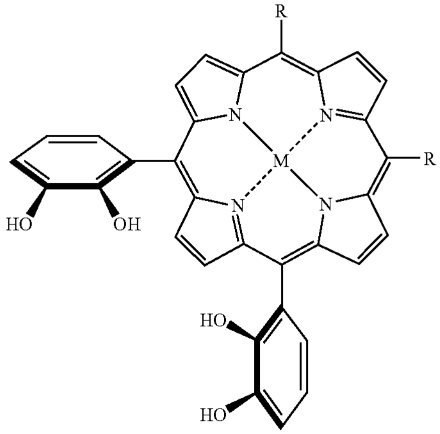

Structures (2) and (9) may be used as the racemate or R or S enantiomers. In structure (5), R' and R' can be 2H (i.e. an etheno bridge) or a fused benzo unit (i.e. a triptycene).

A preferred point of contortion is provided by the spiro-indane moiety (substituted or unsubstituted). A further preferred point of contortion comprises moieties linked by a sterically congested single covalent bond linking adjacent hydrocarbon moieties. By virtue of the steric congestion there is significant restriction of relative movement of the linked moieties around the single covalent bond.

Examples of $X_2$—R'—$X_2$ monomers which represent the generally planar species are:

(3)

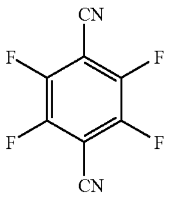

-continued (16)

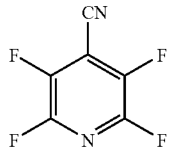

(17)

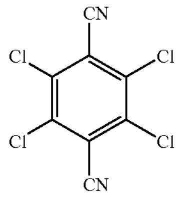

(18)

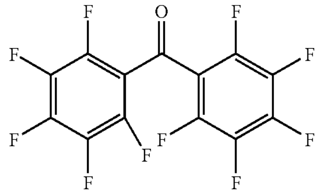

(19)

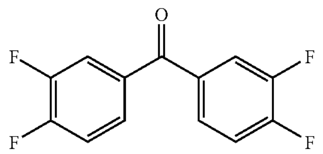

(20)

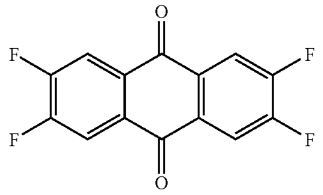

(21)

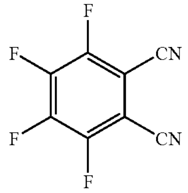

(22)

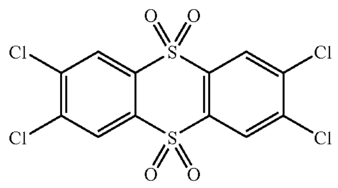

(23)

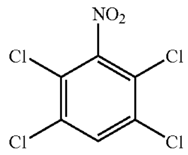

-continued
(24)
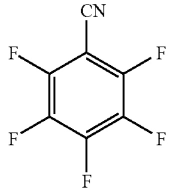
(25)
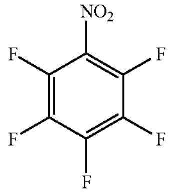
(26)
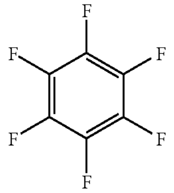
(27)
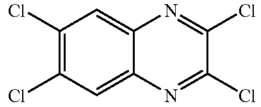
(28)
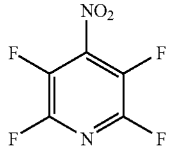
(29)
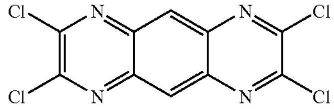
(30)
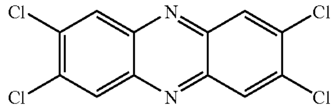
Alternatively, the point of contortion may be present in the monomer containing the leaving groups and the generally planer species may be the nucleophile-containing monomer. Examples of $X_2$—R'—$X_2$ compounds which comprise points of contortion are:
(31)
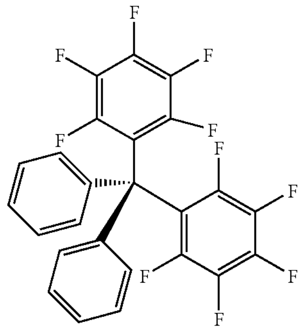
-continued
(32)
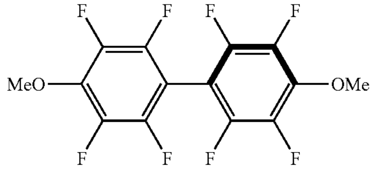
(33)
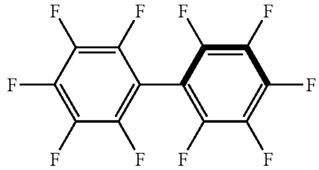
Examples of $Nu_2$-R-$Nu_2$ compounds representing the generally planar species are:
(34)
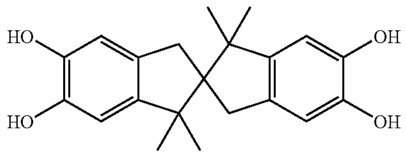
(35)
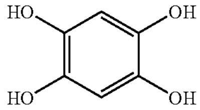
(36)
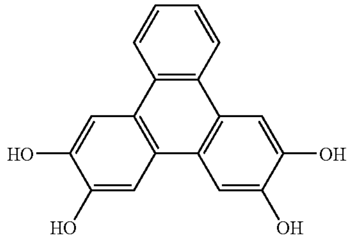
(37)
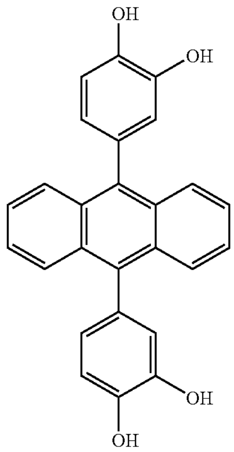

-continued (38)

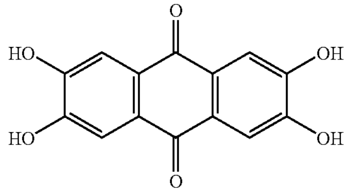

(39)

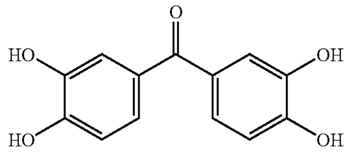

(40)

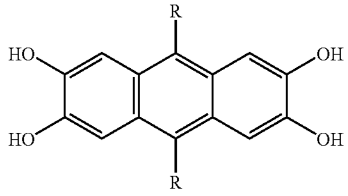

(41)

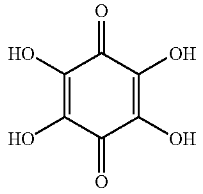

(42)

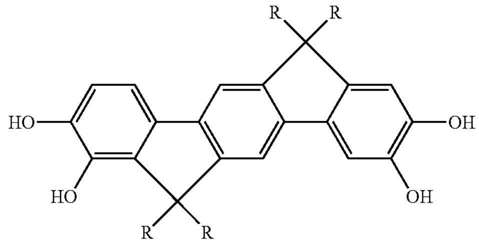

In certain applications it may be desirable to convert a first nucleophile-containing monomer to a monomer containing leaving groups prior to reaction of the (newly formed) monomer containing leaving groups with a second nucleophile-containing monomer. One way in which this can be achieved is shown in reaction scheme C.

Reaction scheme C:

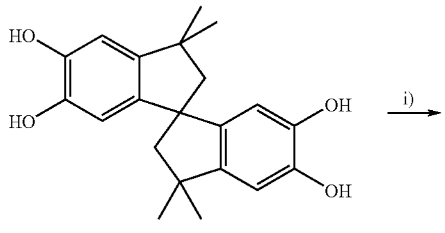

(2)

-continued

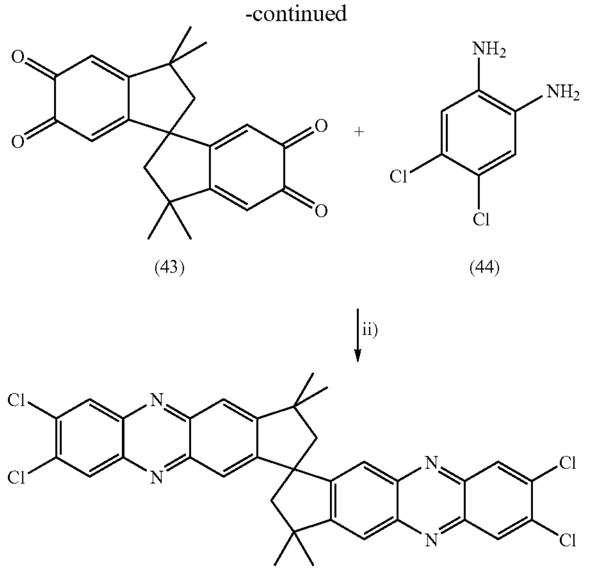

(43) (44)

(45)

i) oxidation;
ii) acetic acid, 100° C.

It will be evident that the process shown in scheme C is generally applicable to any of the $Nu_2$-R-$Nu_2$ compounds which include points of contortion (2, 4-15).

The second sub-class of materials are produced by reacting a $(H_2N)_2$—R—$(NH_2)_2$ monomer with a $(keto)_2$-R'-(keto)2 or (keto)(hydroxy)-R'-(hydroxy)(keto) monomer. The point of contortion may be present in the $(keto)_2$-R'-$(keto)_2$ or (keto)(hydroxy)-R'-(hydroxy)(keto) monomer alone, in which case the $(H_2N)_2$—R—$(NH_2)_2$ monomer represents the planar species (exemplified by reaction scheme D).

Reaction scheme D

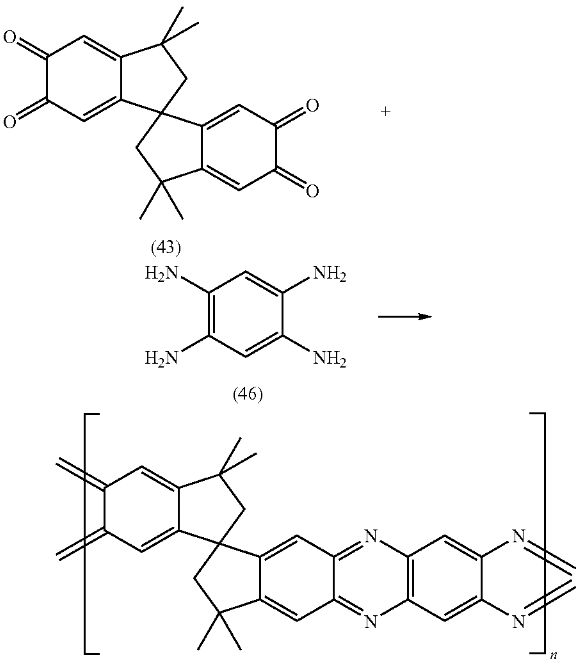

(43)

(46)

(47)

Alternatively, the point of contortion may be present in the $(H_2N)_2$—R—$(NH_2)_2$ monomer alone, in which case the $(keto)_2$-R'-$(keto)_2$ or (keto)(hydroxy)-R'-(hydroxy)(keto) monomer represents the planar species (exemplified by reaction scheme E).

Reaction scheme E

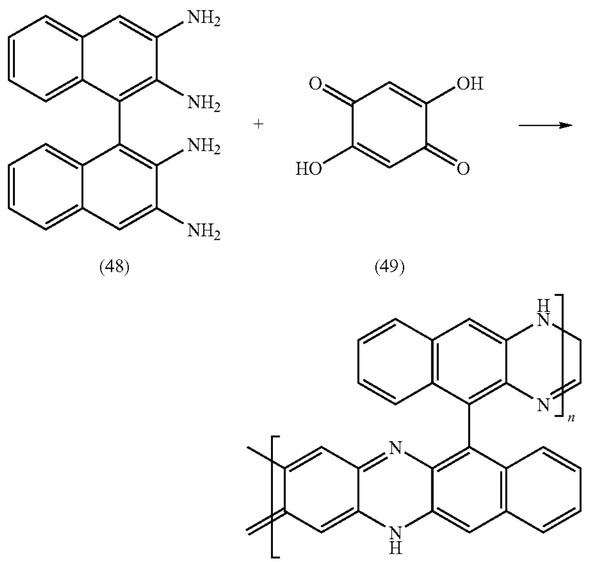

(48) (49)

(50)

Further examples of planar $(keto)_2$-R'-$(keto)_2$ monomers are presented below:

(51)

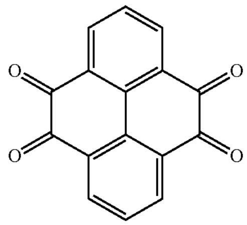

(52)

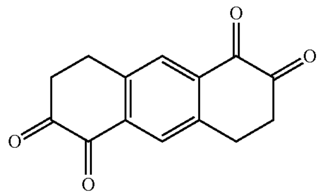

Further examples of planar and contorted $(H_2N)_2$—R—$(NH_2)_2$ monomers are presented below:

(53)

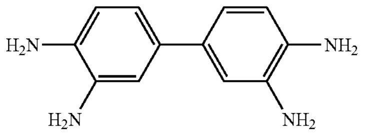

-continued (54)

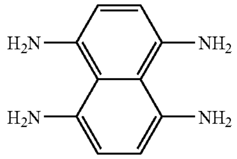

(55)

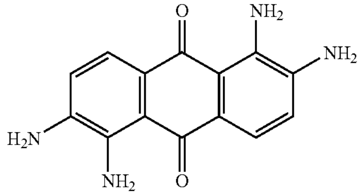

(56)

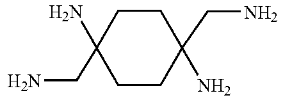

(57)

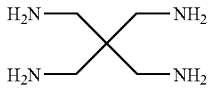

(58)

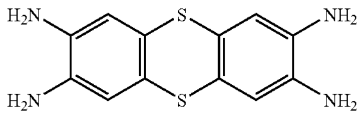

(59)

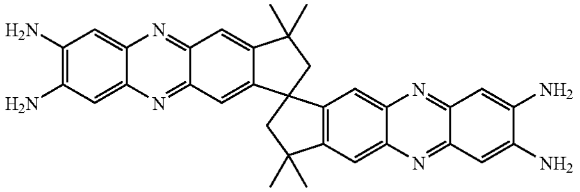

(60)

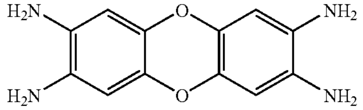

(61)

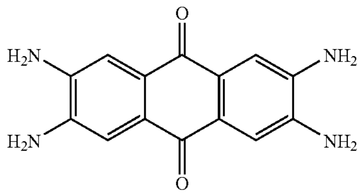

In addition to reaction schemes D and E above, a point of contortion may be present in both the $(keto)_2$-R-$(keto)_2$/(keto)(hydroxy)-R-(hydroxy)(keto) monomer and the $(H_2N_2)_2$—R—$(NH_2)_2$) monomer.

Compounds falling in to the third sub-class of materials are produced by the reaction of a nucleophilic monomer comprising an $(H_2N)_2$—R—$(NH_2)_2$ compound with a bis-anhydride or bis-dicarboxylic acid monomer. As before, the point of contortion may form part of the $(H_2N)_2$—R—$(NH_2)_2$ monomer, bis-anhydride or bis-dicarboxylic monomer, or both types of monomers. Reaction scheme F below exemplifies the situation where the point of contortion, in this case a spiro-indane moiety, is contained in an acidic bis-anhydride monomer and the planar species is represented by the basic compound 1,2,4,5-tetraaminobenzene (46):

Reaction scheme F

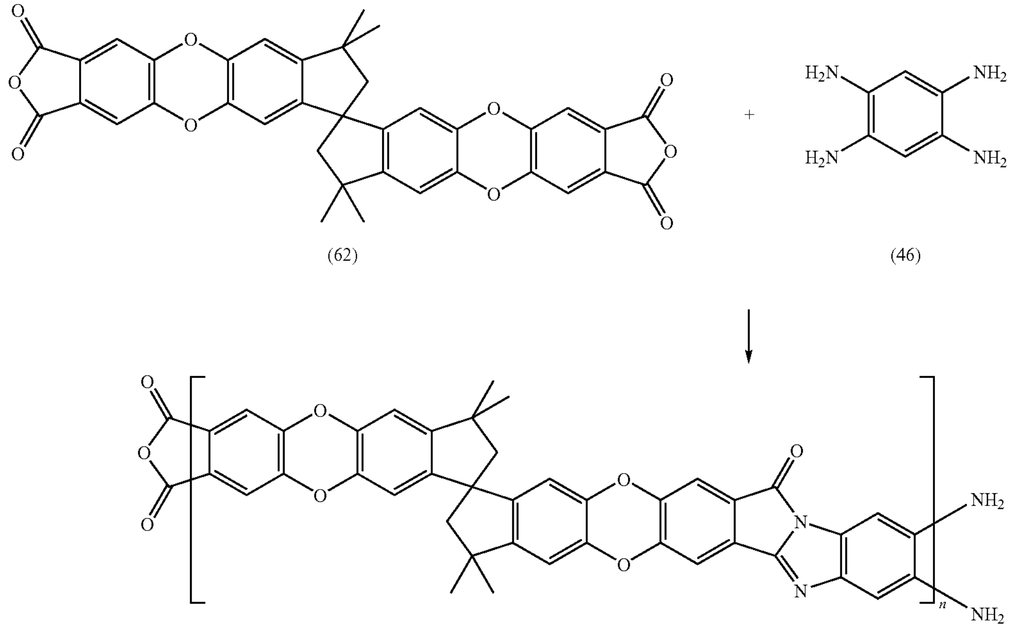

(62)

(46)

(63)

It will be apparent that 1,2,4,5-tetraaminobenzene (46) may be substituted in reaction scheme F with any of the $(H_2N)_2$—R—$(NH_2)_2$ monomers described above (48, 53-61).

Examples of carboxylic anhydride or acid monomers which represent the planar species are shown below:

(64)

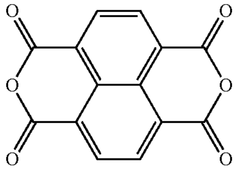

(65)

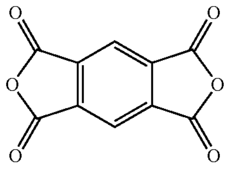

(66)

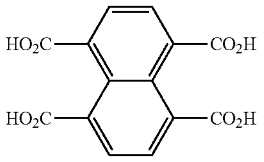

The overriding principle concerning compounds falling in to the second and third sub-classes of materials is that one of the monomers comprises a plurality of nucleophilic groups (e.g. $NH_2$) and the other monomer comprises a plurality of electropositive carbon atoms bonded to electronegative atoms, such as oxygen atoms forming part of keto-, hydroxyl-, anhydrido- or carboxylic acid groups.

The fourth sub-class of materials comprises compounds containing orthocarbonate groups. In this case, any one of the $Nu_2$-R-$Nu_2$ compounds (2, 4-15, 34-42) is first converted to the corresponding bis-orthocarbonate compound, as exemplified in reaction scheme G:

Reaction scheme G

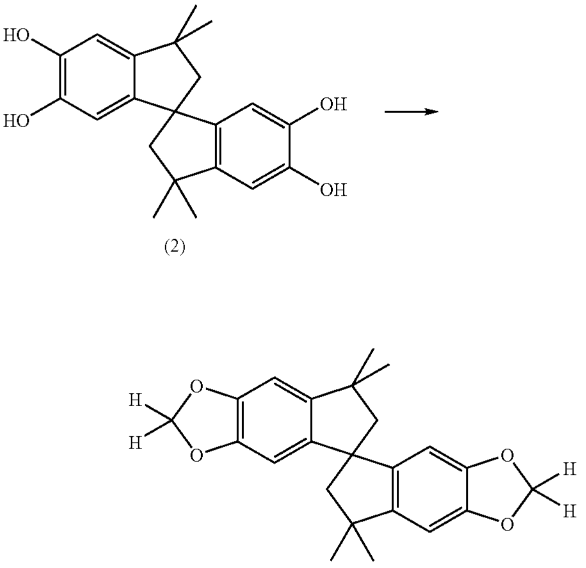

(2)

(67)

The bis-orthocarbonate produced (67) is then halogenated thus:

Reaction scheme H

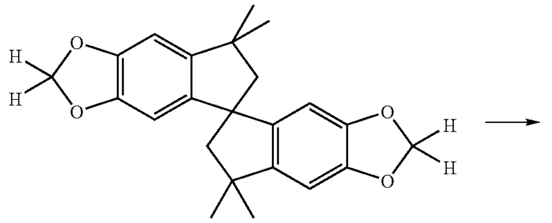

(67)

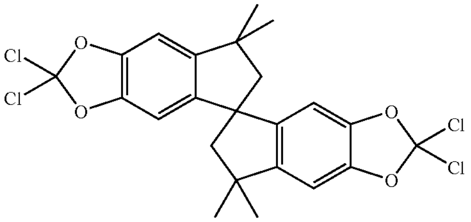

(68)

The halogenated bis-orthocarbonate (68) may then be reacted with one of the planar $Nu_2$-R-$Nu_2$ compounds (34-42) or one of the $Nu_2$-R-$Nu_2$ compounds containing a point of contortion (2, 4-15), provided that at least one of the halogenated bis-orthocarbonate or the $Nu_2$-R-$Nu_2$ compounds contains a point of contortion. For example, since the halogenated bis-orthocarbonate (68) produced in reaction scheme H contains a point of contortion (the spiro-indane moiety) it can be reacted with either a planar $Nu_2$-R-$Nu_2$ compound (34-42) or a $Nu_2$-R-$Nu_2$ compound containing a further point of contortion (2, 4-15), as shown below in reaction scheme I, to produce a microporous material possessing intrinsic microporosity in accordance with the present invention. Whereas, if the halogenated bis-orthocarbonate did not contain a point of contortion it would have to be reacted with a $Nu_2$-R-$Nu_2$ compound which did contain a point of contortion, e.g. any of compounds 2, 4-15.

Reaction scheme I

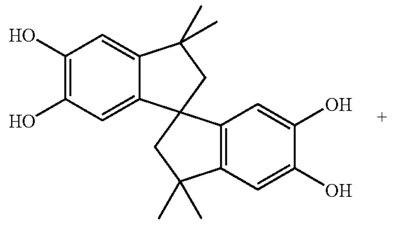

(2)

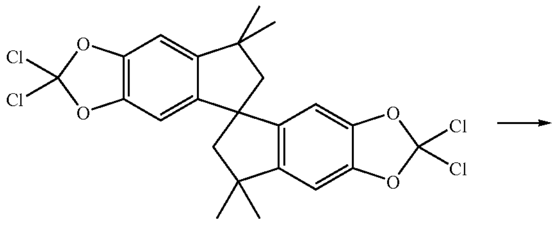

(68)

-continued

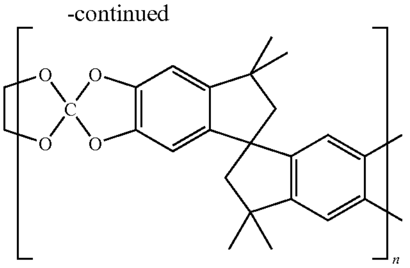

(69)

Materials falling into sub-classes one and four are clearly related by the fact that each comprise polymers which have been produced by the substitution of halogen atoms by nucleophiles such as hydroxyl groups.

The fifth sub-class of materials are formed by the reaction of a $Nu_2$-R-$Nu_2$ monomer (2, 4-15, 34-42) with a compound containing a metal ion (such as Ti, Sn, Al, B, Ni, Cr, Co, Cd), or phosphorus or silicon (generally designated M in formula 70 below) as exemplified by the reaction of compound 2 below:

Reaction scheme J

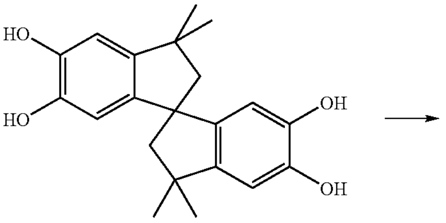

(2)

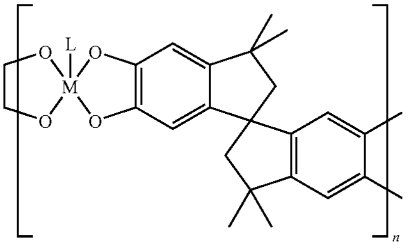

(70)

It will be clear to the skilled person that depending upon the nature of M, at least one additional M-coordinating ligand or counter ion may be required. Furthermore, depending upon the conformational constraints imposed on the structure of the repeating unit by the arrangement of ligands around the M-centre (for example, planar (Ni), tetrahedral (Si), pentahedral (P), e.g. trigonal bipyramidal or square based pyramidal, or octahedral (Cr)) the $Nu_2$-R-$Nu_2$ monomer may or may not contain a point of contortion as long as the repeating unit contains at least one point of contortion.

It is envisaged that polymers may be made which contain any number of types of nucleophilic monomer bonded to any number of types of monomer comprising suitable leaving groups. Furthermore, any number of types of sites of contortion may be combined with any number of types of rigid linker to produce a microporous organic material possessing the desired characteristics to suit a particular application.

In addition, it should be noted that many of the inventive materials can be modified using simple reactions of the functional group(s) that they contain, e.g. hydrolysis of nitrile substituents (exemplified by reaction scheme K) and quaternarisation of amine functionality (exemplified by reaction scheme L). Such reactions may also be used to cross-link the inventive materials to render them insoluble, which may be desirable for certain applications.

Reaction scheme K

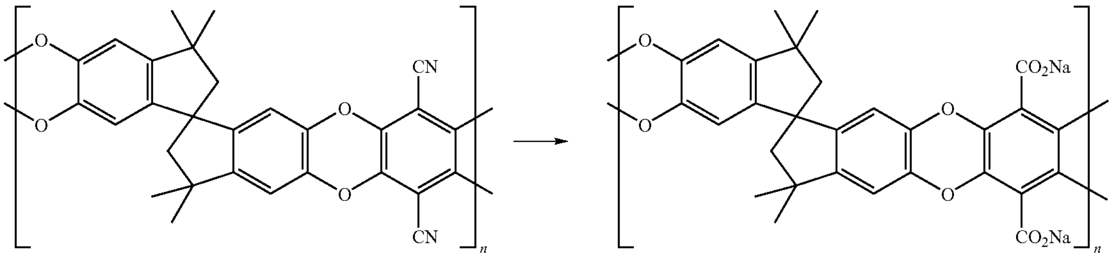

(1) (71)

Reaction scheme L

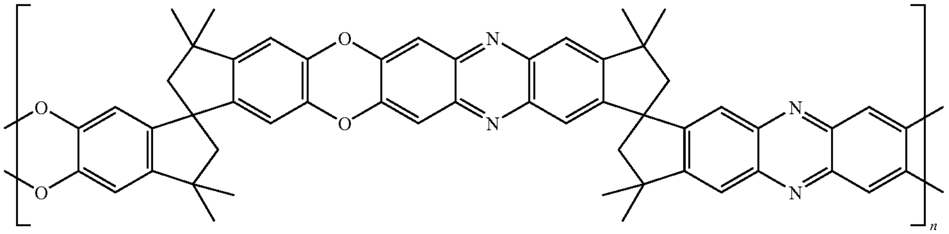

(72)

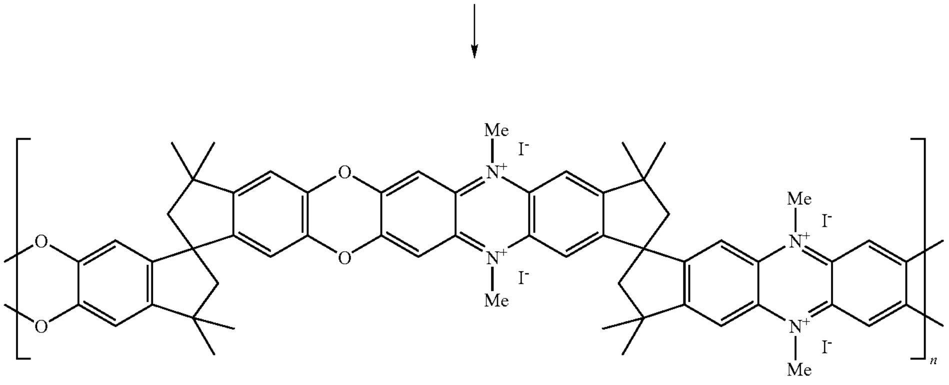

(73)

The present invention is illustrated with reference to the following non-limiting Examples and accompanying figures, in which.

Figure 7:
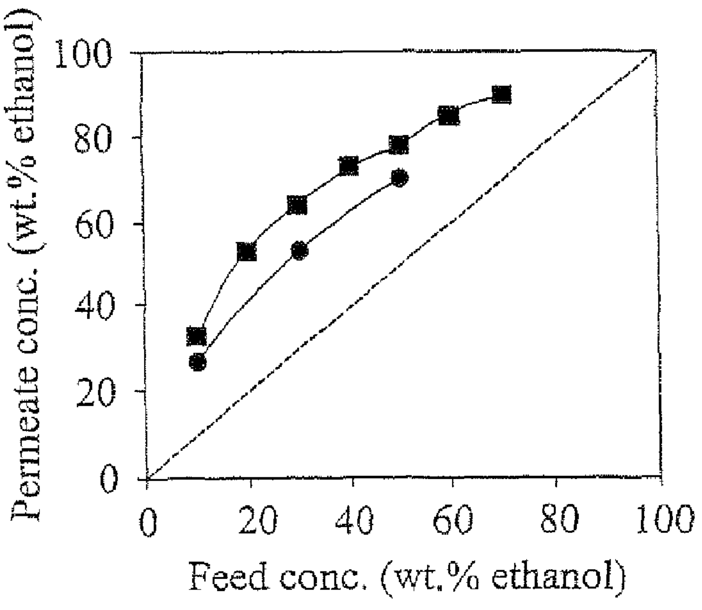
Figure 8:
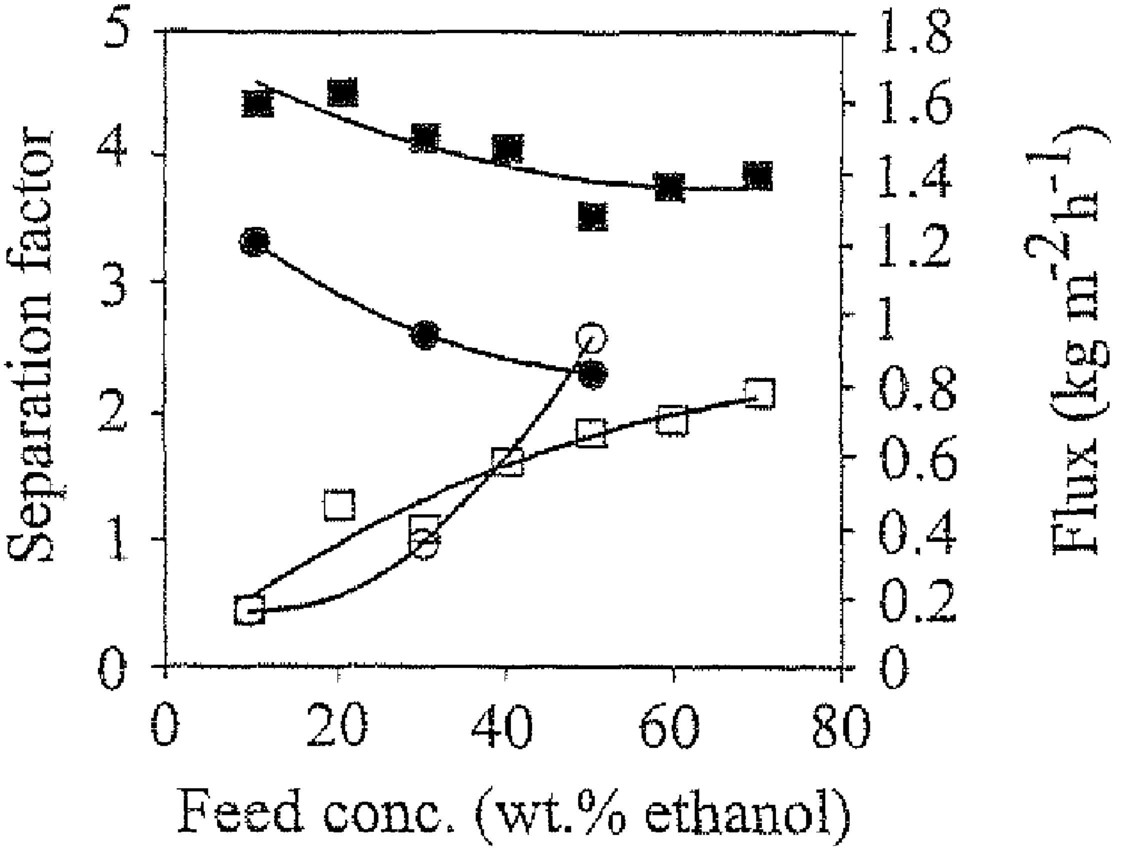

FIG. 7 is a graphical representation of the variation in ethanol concentration in a permeate solution as a function of ethanol concentration in a feed solution for a series of ethanol/water mixtures subjected to a pervaporation process using the membrane of Example 4 and the membrane of Example 6; and FIG. 8 is a graphical representation of separation factor and flux data for a series of ethanol/water mixtures subjected to a pervaporation process using the membrane of Example 4 and the membrane of Example 6.

Details of the preparation of two compounds (1 and 74) which exemplify aspects of the present invention are set out below in Examples 1 and 2.

Details of a series of experiments conducted to investigate the intrinsic properties of microporous materials in accordance with aspects of the present invention are presented in Example 3.

The formation of free-standing and supported membranes comprising compound 1 is described in Examples 4 and 6, and the formation of a cross-linked membrane comprising compound 74 is described in Example 5.

Example 7 provides details of the separation of a phenol/water mixture using the free-standing membrane formed in Example 4.

Example 8 provides details of the separation of ethanol/water mixtures using the free-standing membrane formed in Example 4.

Examples 9 to 18 provide further details of the preparation of compounds in accordance with the present invention.

EXAMPLE 1

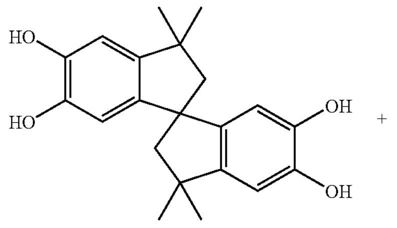

(2)

-continued

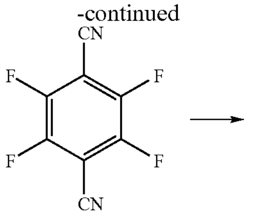

(3)

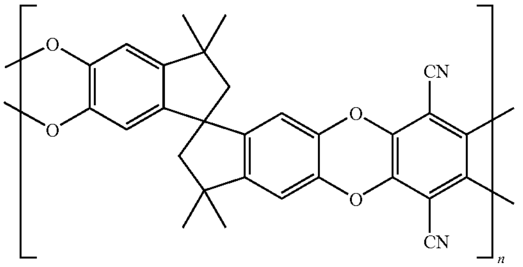

(1)

A mixture of anhydrous potassium carbonate, 3,3,3',3'-tetramethyl-1,1"-spirobisindane-5,5',6,6'-tetrol (2; 10.25 g, 30.1 mmol) and 2,3,5,6-tetrafluoroterephthalonitrile (3; 6.02 g, 30.1 mmol) in dry DMF (200 mL) was stirred at 65° C. for 72 h. On cooling, the mixture was added to water (300 mL) and the crude product collected by filtration. Repeated reprecipitations from methanol gave 13.15 g (95%, yield) of fluorescent yellow polymer 1. (Found C, 74.85; H, 4.23; N, 6.04% $C_{29}H_{20}N_2O_4$ requires C, 75.64; H, 4.38; N, 6.08%); $\delta_H$ (300 MHz, $d_6$-$CDCl_3$): 1.20-1.5 (12H, br m), 2.15-2.5 (4H, br m), 6.5 (2H, br s), 6.8 (2H, br s); $M_n$=170×10$^3$ amu; $M_w$=290×10$^3$ amu (using GPC vs. polystyrene standards); Surface area (powder, $N_2$ adsorption, BET calculation)=811 m$^2$ g$^{-1}$.

Figure 4:
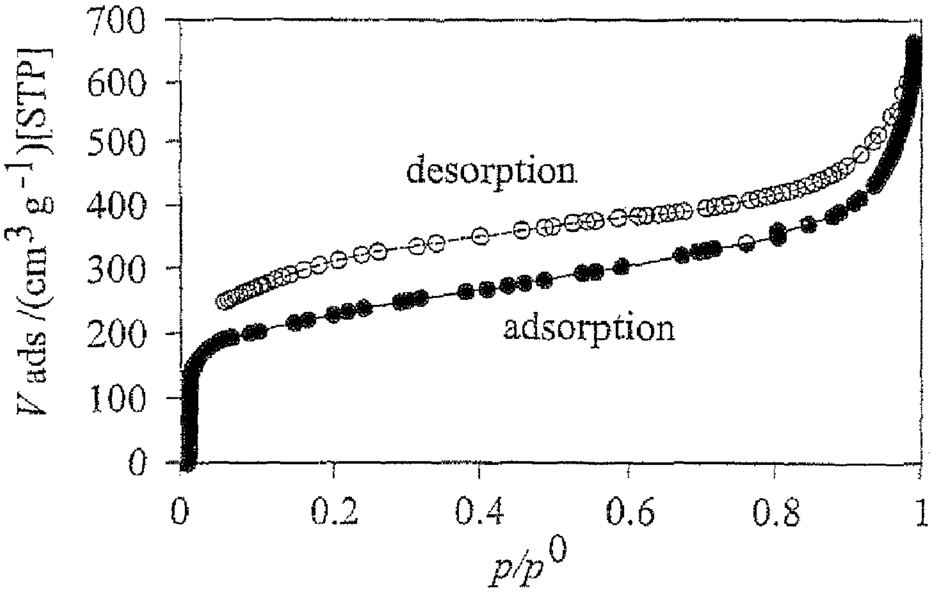
FIG. 4 is a $N_2$ adsorption/desorption isotherm for the polymer produced in Example 1.

A $N_2$ adsorption/desorption isotherm for polymer 1 is shown in FIG. 4.

EXAMPLE 2

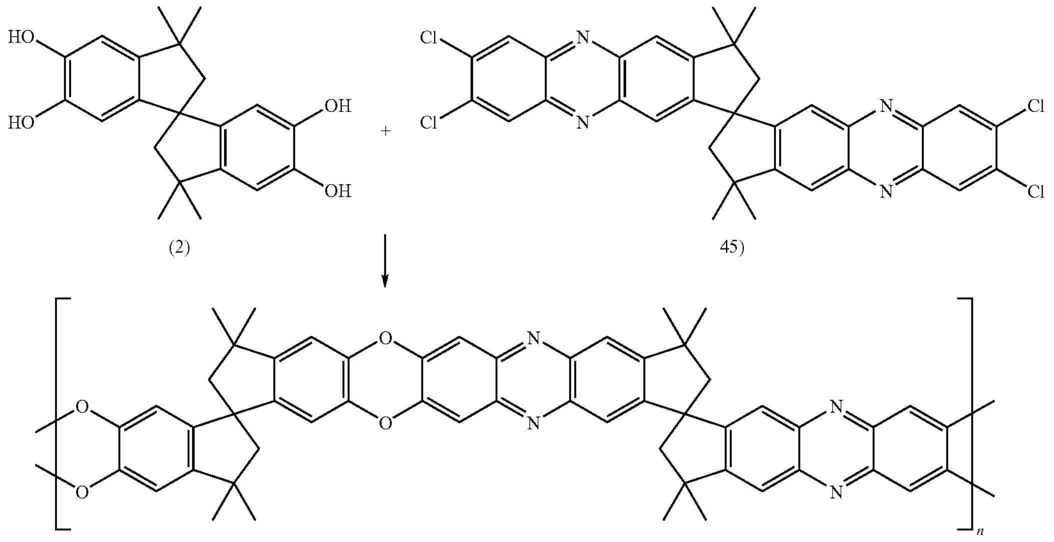

(2) 45)

(74)

A mixture of anhydrous potassium carbonate, 3,3,3',3'-tetramethyl-1,1"-spirobisindane-5,5',6,6'-tetrol (2; 0.58 g, 1.7 mmol) and monomer 45; 1.05 g, 1.7 mmol) in dry DMF (70 mL) was stirred at 120° C. for 72 h. On cooling, the mixture was added to water (300 mL) and the crude product collected by filtration. Repeated reprecipitations from methanol gave 0.98 g (71%, yield) of a yellow polymer 74. (Found C, 77.43; H, 5.35; N, 6.57; Cl, 1.32% $C_{54}H_{44}N_4O_4$ requires C, 79.78; H, 5.46; N, 6.89; Cl, 0.00%); $\delta_H$ (300 MHz, $d_6$-$CDCl_3$); 1.40 (12H, br m), 1.66 (12H, br m), 2.15-2.5 (4H, br m), 2.70 (4H, br m), 6.5 (2H, br s), 6.9 (2H, br s), 7.3-7.7 (6H, br m), 7.95 (2H, br s); $M_n$=18×10$^3$ amu; $M_w$=50×10$^3$ amu (using GPC vs. polystyrene standards); Surface area (powder, $N_2$ adsorption, BET calculation)=695 m$^2$ g$^{-1}$; Surface area (film, $N_2$ adsorption, BET calculation)=640 m$^2$ g$^{-1}$.

EXAMPLE 3

Intrinsic Properties of Microporous Materials

Polydioxane A (1), also referred to herein as PIM-1, was prepared as described in Example 1 and formed in to films of thickness 46 μm and 91 μm in accordance with the method set out in Example 4 for the preparation of a 60 μm film. Gas permeation data were then measured for a range of gases, which are listed in Tables 1 and 2.

TABLE 1

| PIM-1 (1) film thickness 46 µm. | | | | |
|---|---|---|---|---|
| GAS | Diffusivity, ($cm^2/s \times E^{-8}$) | Solubility, ($cm^3/cm^3$ $cmHg \times E^{-3}$) | Permeability, Barrer | P ($X/N_2$) |
| $O_2$ | 82 | 46 | 380 | 4.0 |
| $N_2$ | 23 | 42 | 94 | 1.0 |
| He | 2300 | 3.0 | 670 | 7.1 |
| Ar | 40 | 50 | 200 | 2.1 |
| Xe | 0.45 | 1200 | 55 | 0.59 |
| $H_2$ | 1700 | 7.8 | 1360 | 14 |
| $CO_2$ | 26 | 910 | 2370 | 25 |
| $CH_4$ | 6.9 | 180 | 126 | 1.3 |
| Propene | 0.44 | 3800 | 160 | 1.7 |
| Propane | 0.040 | 3100 | 12 | 0.13 |

TABLE 2

| PIM-1 (1) film thickness 91 µm. | | | | |
|---|---|---|---|---|
| GAS | Diffusivity, ($cm^2/s \times E-8$) | Solubility, ($cm^3/cm^3$ $cmHg \times E-3$) | Permeability, Barrer | P ($X/N_2$) |
| $O_2$ | 150 | 36 | 535 | 3.5 |
| $N_2$ | 45 | 35 | 155 | 1.0 |
| He | 5000 | 1.5 | 740 | 4.8 |
| $H_2$ | 3000 | 5.3 | 1600 | 10 |
| $CO_2$ | 55 | 670 | 3700 | 24 |
| $CH_4$ | 17 | 140 | 240 | 1.5 |

Figure 1:
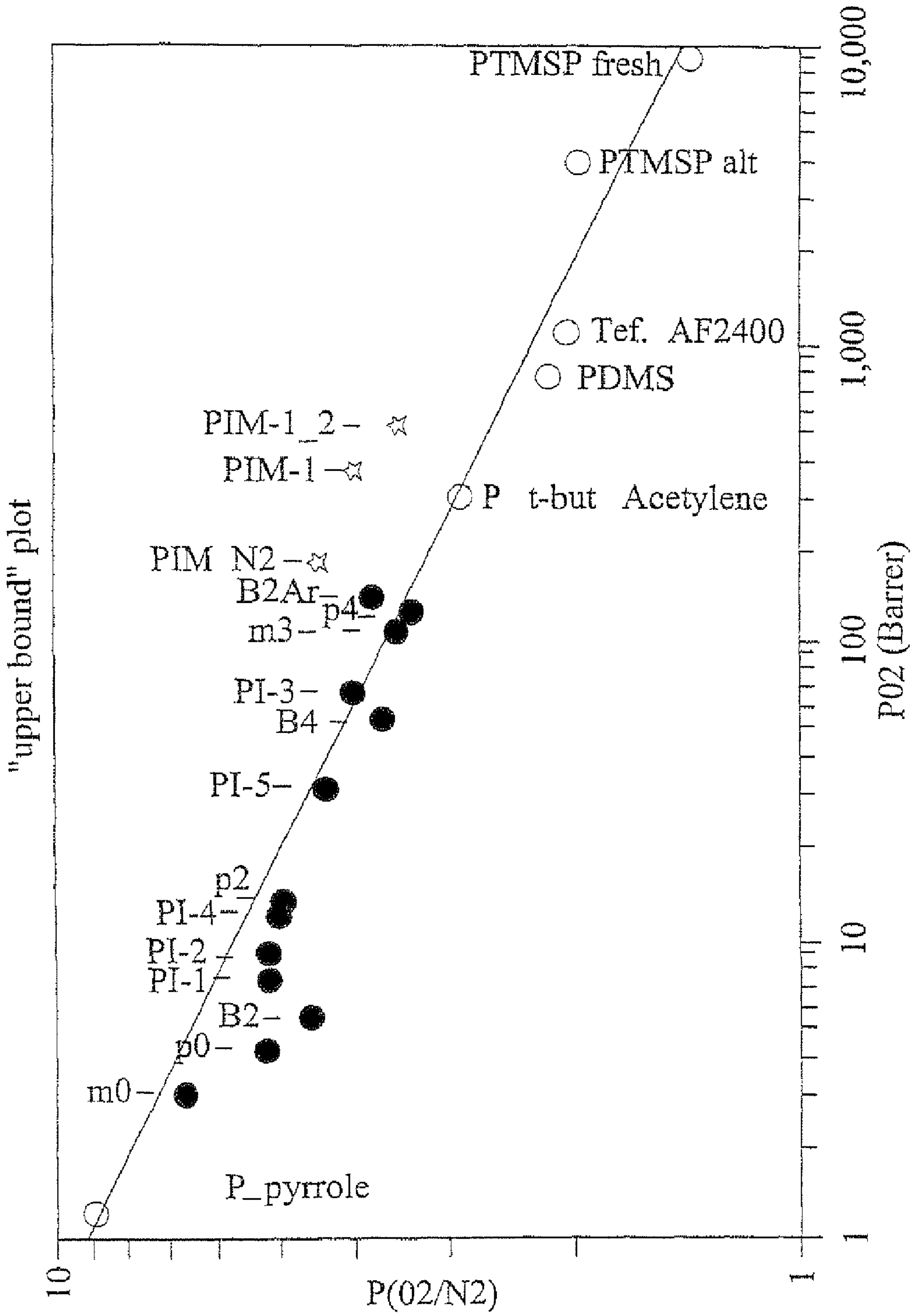
FIG. 1 is an 'upper bound' plot of permeability verses selectivity for a range of polymers of high permeability.

The measured gas permeation data were used to calculate permeability/selectivity values for the two films which were then plotted on an 'upper bound' plot as shown in FIG. 1 (PIM-1=46 µm film and PIM-1__2=91 µm film). The results indicated that for most gases, including oxygen and nitrogen as shown in FIG. 1, PIM-1 (1) exhibited a permeability/selectivity relationship above the 'upper bound' which represents a significant advance over prior art materials.

The gases decreased in permeability according to: $CO_2$>$H_2$>He>$O_2$>Ar>$CH_4$, Propene>Xe>Propane. For the gases $CO_2$, $H_2$, He, $O_2$, $N_2$, $CH_4$, and Xe an increase of permeability with decreasing feed pressure was observed. For propene and propane a decrease of permeability with decreasing feed pressure was found. E.g., P($O_2$) at 320 mbar feed pressure was 367 Barrer and increased to 383 Barrer at 76 mbar feed pressure. Propene decreased from 202 Barrer at 690 mbar feed pressure to 126 Barrer at 190 mbar. This behaviour is well known for polymers with extremely high free volume (Stern 1994). The higher permeability and slightly lower selectivity for the thicker sample is explained by different evaporation conditions thus forming a less tightly packed polymer. These results indicate that PIM-1 (1) would be especially well suited for separation of $O_2$ or $N_2$ from air, of $CO_2$ from $N_2$, $CH_4$ and/or Xe, of $H_2$ from $N_2$ and/or $CH_4$.

Figure 2:
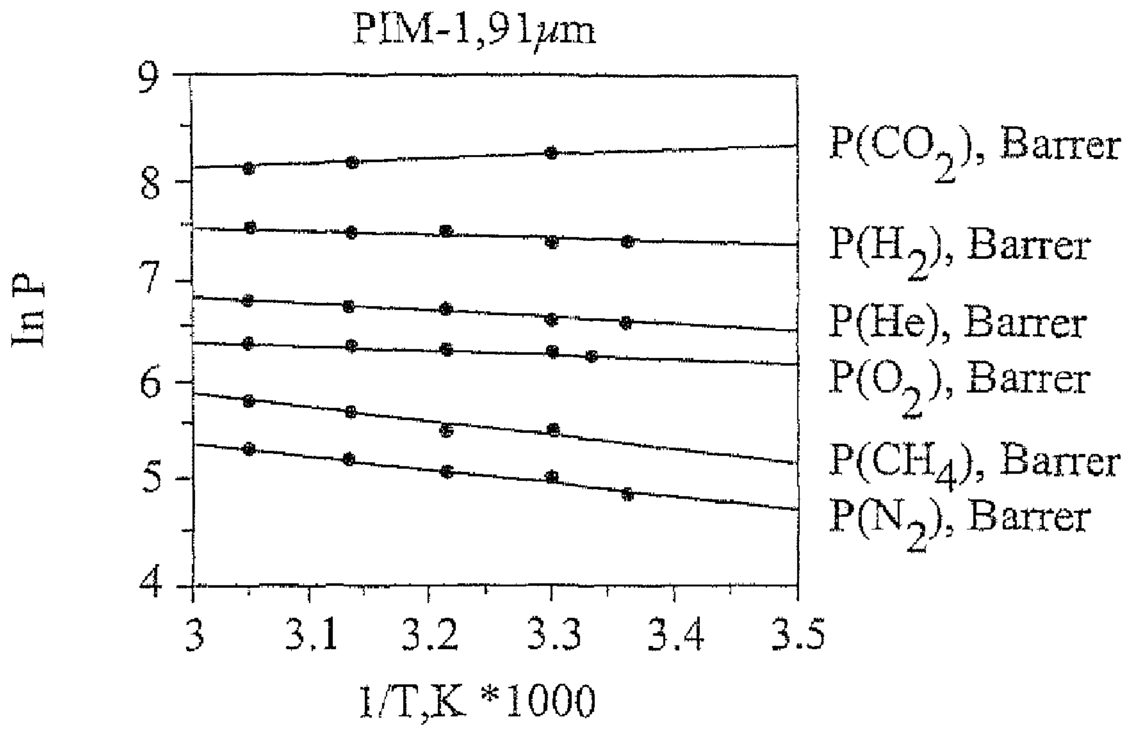
FIG. 2 is a graphical representation of the temperature dependence of gas permeation for a 91 μm thick film of Polydioxane A (1)

The stability of the PIM-1 (1) polymer films to temperature and to thermal aging was tested by varying the temperature for gas permeation experiments from 25 to 55° C. and back to 30° C. Within the 8 days of measurement no change in permeability was detected thus demonstrating the thermal stability of the polymer. The results of these experiments for the 91 µm PIM-1 (1) polymer film are shown in FIG. 2. The slope and intercept of the linear regression are reported in Table 3. For example, with increasing temperature the oxygen permeability increased from 511 Barrer (at 20° C.) to 600 Barrer (at 60° C.) accompanied by a decrease in selectivity (P($O_2$/$N_2$)) from 4.0 to 2.8.

TABLE 3

| Temperature dependence of permeability of 91 µm PIM-1 (1) polymer film. | |
|---|---|
| Gas | Regression |
| $O_2$ | y = 7.58 − 0.394x |
| $N_2$ | y = 9.22 − 1.28x |
| He | y = 8.77 − 0.647x |
| $H_2$ | y = 8.66 − 0.382x |
| $CO_2$ | y = 6.43 + 0.543x |
| $CH_4$ | y = 9.74 − 1.3x |

For comparative purposes, an alternative microporous polymer, PIM-N2 (74) was synthesised as described in Example 2 and formed in to a thin film of thickness 28 µm in accordance with the method set out in Example 4 for a 60 µm film. Gas permeation data were then measured for 8 of the 10 gases for which tests were conducted using PIM-1. The results of the tests carried out using PIM-N2 are shown in Table 4.

TABLE 4

| PIM-N2 film thickness 28 µm. | | | | |
|---|---|---|---|---|
| GAS | Diffusivity, ($cm^2/s \times E^{-8}$) | Solubility, ($cm^3/cm^3$ $cmHg \times E^{-3}$) | Permeability, Barrer | P ($X/N_2$) |
| $O_2$ | 62 | 30 | 190 | 4.5 |
| N2 | 16 | 26 | 42 | 1.0 |
| He | 760 | 6 | 450 | 10.8 |
| Ar | 30 | 34 | 100 | 2.4 |
| Xe | 0.37 | 710 | 26 | 0.62 |
| $H_2$ | 940 | 9.6 | 866 | 21 |
| $CO_2$ | 21 | 530 | 1100 | 26 |
| $CH_4$ | 5.1 | 120 | 62 | 1.5 |

In comparison to PIM 1, PIM-N2 exhibited a higher selectivity but a lower permeability. Even though PIM-N2 exhibited a permeability for each gas which was approximately half that of PIM-1, it should be noted that the permeabilities for PIM-N2 are still acceptably high. Thus, these results indicate that PIM-N2 would also be suitable for the separation of $O_2$ or $N_2$ from air, of $CO_2$ from $N_2$, $CH_4$ and/or Xe, of $H_2$ from $N_2$ and/or $CH_4$.

Membrane Formation

EXAMPLE 4

Free Standing Film 0.5 g of the polymer 1 prepared in Example 1 was added to a conical flask. Solvent (THF; 25 ml) was poured into the conical flask, a magnetic stirrer bar added, then the flask was closed with a cap. The flask was placed on a magnetic stirrer until the polymer completely dissolved. The dissolved polymer was poured into a glass petri dish of diameter 12 cm. The petri dish was placed in a dessicator under a slow flow of nitrogen and left until the polymer was dry (about 4 days). The thickness of the membrane was measured as 60 µm (average of 7 measurements) with a micrometer screw gauge. The membrane was yellow in colour and exhibited luminescence under ultraviolet light. It had a surface area of 622 $m^2$ $g^{-1}$ by nitrogen adsorption.

EXAMPLE 5

Cross-linked Membrane

The polymer 74 prepared in Example 2 was formed in to a membrane using the same process as described above in Example 4. The membrane was immersed in a solution of bis(benzonitrile)dichloropalladium(II) (1.0 g) in methanol (200 ml) and then washed in chloroform.

EXAMPLE 6

Supported Membrane

A solution of polymer 1 was prepared in accordance with Example 1 above and was then deposited on a porous zirconia ceramic support reinforced with metal mesh and left to dry under a stream of nitrogen.

EXAMPLE 7

Separation by Pervaporation of a Phenol/Water Mixture

Figure 3:
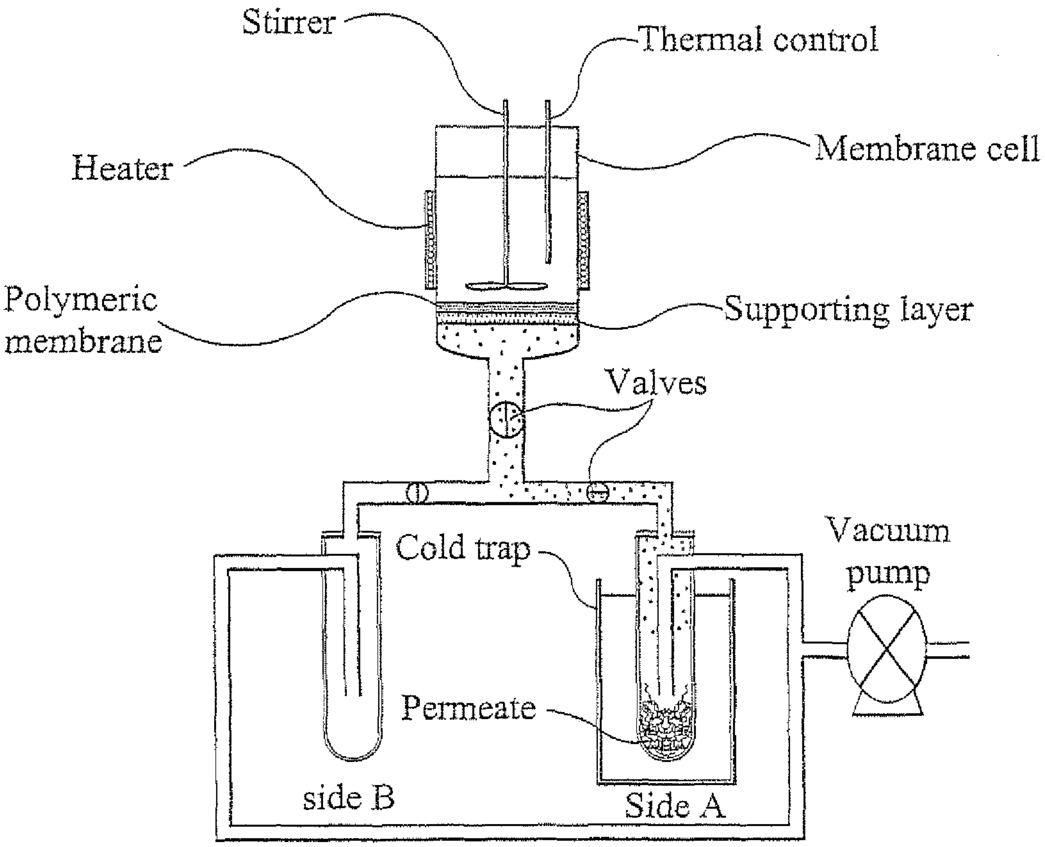
FIG. 3 is a schematic representation of a pervaporation rig employed in Example 7.

The membrane prepared in Example 4 (60 μm thick) was tested using a standard batch pervaporation rig (FIG. 3). The circular flat membrane was clamped into a sealed glass test cell above a porous support with an elastomeric O-ring and a silicone rubber compound (RS), forming a leak free seal, giving a pervaporation area of 33.17 $cm^2$. The cell was filled with the feed solution (mixture of phenol in water; 400 mL) and a mechanical stirrer placed in the cell. Stirring was necessary to reduce the effects of concentration polarization arising from the high selectivity of the membrane and the low concentration of phenol in the feed. Three samples were tested using feed solutions containing phenol in water at concentrations of 1, 3 and 5 wt. % phenol. The cell temperature was controlled and measured with a thermocouple and electronic temperature control system. The cell temperature was controlled at temperatures in the range 50-80° C. A vacuum pump on the downstream side maintained a low pressure. The pressure was measured between the cell and the cold trap. The permeate was condensed and frozen within the cold trap, which was cooled with liquid nitrogen. The concentration of phenol in the permeate was measured by UV spectroscopy using the phenol absorption band at 270 nm.

Figure 5:
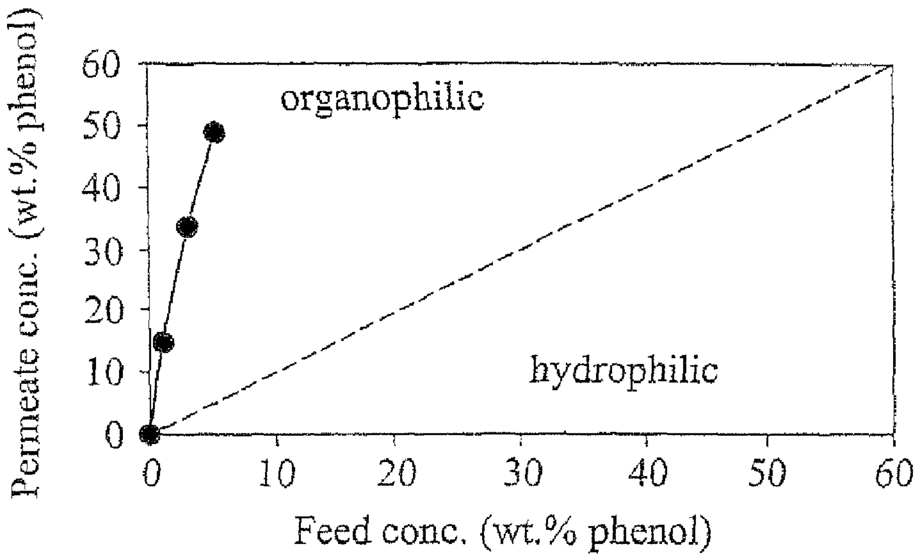
FIG. 5 is a graphical representation of the variation in phenol concentration in a permeate solution as a function of phenol concentration in a feed solution for a series of phenol/water mixtures subjected to a pervaporation process using the membrane of Example 4.

The percentage of phenol in the permeate versus that in the feed for the three samples at 70° C. is shown in FIG. 5, the dashed line would be followed if no separation occurred. The results presented in FIG. 5 illustrate that concentration of phenol in the permeate has increased compared to that in the feed. These results demonstrate that effective separation of phenol from the phenol/water mixture is taking place across the inventive membrane.

Figure 6:
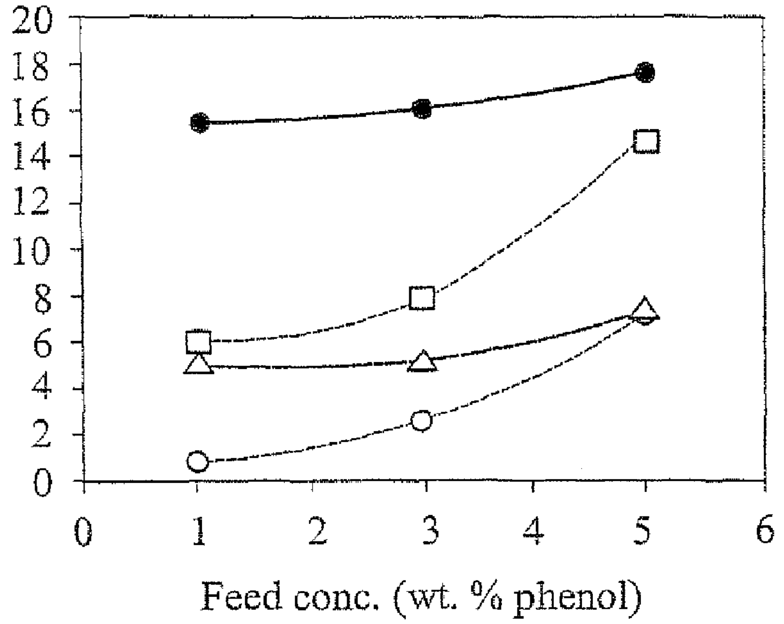
FIG. 6 is a graphical representation of separation factor and flux data for a series of phenol/water mixtures subjected to a pervaporation process using the membrane of Example 4.

The separation factors for each sample and the values of flux for phenol and water are shown in FIG. 6.

Separation factor is defined as $$\text{Separation factor}=(Y_1/Y_2)/(X_1/X_2)$$

where $(Y_1/Y_2)$ is the weight ratio of component 1 (i.e., the organic compound) to component 2 (i.e., water) in the permeate and $(X_1/X_2)$ is the weight ratio of component 1 to component 2 in the feed.

EXAMPLE 8

Separation by Pervaporation of Ethanol/Water Mixtures

A membrane prepared as in Example 4 and a supported membrane prepared as in Example 6, were both tested using a standard batch pervaporation rig (FIG. 3) with a stainless steel test cell. The circular flat membrane was clamped into the steel test cell above a porous support with an elastomeric O-ring and a silicone rubber compound (RS), forming a leak free seal, giving a pervaporation area of 24.6 $cm^2$. The cell was filled with the feed solution (mixture of ethanol and water, 400 mL). The solution was stirred to reduce the effects of concentration polarization. Samples were tested using feed solutions containing ethanol in water at concentrations in the range 10-70 wt. %. The cell temperature was controlled at 30° C. A vacuum pump on the downstream side maintained a low pressure. The permeate was condensed and frozen within the cold trap, which was cooled with liquid nitrogen. The concentration of ethanol in the permeate was measured using a calibrated refractometer.

The percentage of ethanol in the permeate versus that in the feed is shown in FIG. 7 for the pure polymer membrane and for the supported membrane. The dashed line would be followed if no separation occurred. The results presented in FIG. 7 illustrate that the concentration of ethanol in the permeate has increased compared to that in the feed, with the supported membrane giving slightly higher concentrations of ethanol in the permeate. These results demonstrate that effective separation of ethanol from the ethanol/water mixture is taking place across the inventive membrane.

The separation factors and total fluxes achieved for each membrane at various feed compositions are shown in FIG. 8.

EXAMPLE 9

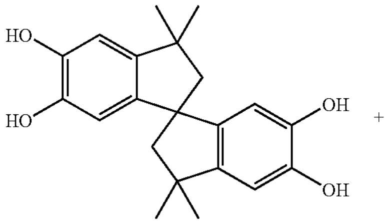

(2)

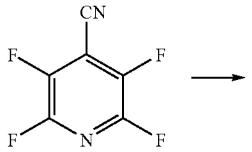

(16)

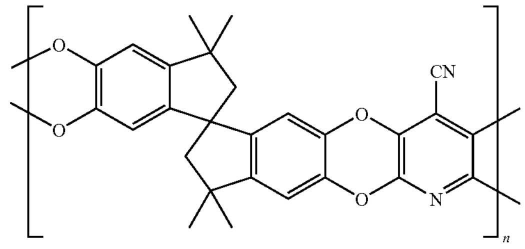

(75)

A mixture of anhydrous potassium carbonate, 3,3,3',3'-tetramethyl-1,1''-spirobisindane-5,5',6,6'-tetrol (2; 1.93 g, 5.68 mmol) and 2,3,5,6-tetrafluoro-4-pyridinecarbonitrile (16; 1.00 g, 5.68 mmol) in dry DMF (50 mL) was stirred at 70° C. for 72 h. On cooling, the mixture was added to water (100 mL) and the crude product collected by filtration. Repeated reprecipitations from methanol gave 2.2 g (91%, yield) of fluorescent yellow/green polymer 75. (Found C, 73.00; H, 4.50; N, 6.40% $C_{27}H_{20}N_2O_4$ requires C, 74.30; H, 4.62; N, 6.42%); $\delta_H$ (300 MHz, $d_6$-$CDCl_3$): 1.20-1.5 (12H, br m), 2.15-2.5 (4H, br m), 6.50 (1H, br s), 6.55 (1H, br s), 6.78 (1H, br s), 6.83 (2H, br s); $M_n$=22×$10^3$ amu; $M_w$=47×$10^3$ amu (using GPC vs. polystyrene standards); Surface area (powder, $N_2$ adsorption, BET calculation)=760 $m^2$ $g^{-1}$.

EXAMPLE 10

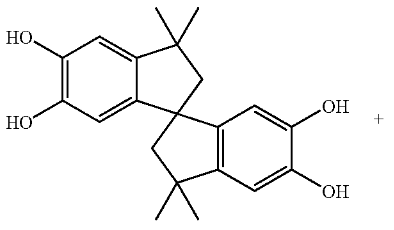

(2)

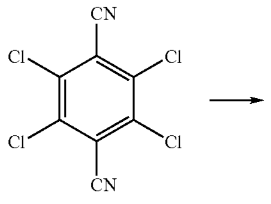

(17)

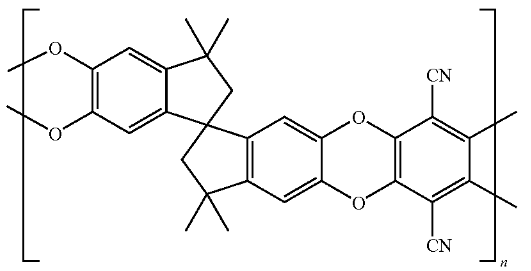

(1)

A mixture of anhydrous potassium carbonate, 3,3,3',3'-tetramethyl-1,1"-spirobisindane-5,5',6,6'-tetrol (2; 1.84 g, 5.40 mmol) and 2,3,5,6-tetrachloroterephthalonitrile (17; 1.44 g, 5.40 mmol) in dry DMF (100 mL) was stirred at 80° C. for 72 h. On cooling, the mixture was added to water (150 mL) and the crude product collected by filtration. Repeated reprecipitations from methanol gave 1.98 g (80%, yield) of fluorescent yellow polymer 1. (Found C, 74.00; H, 4.25; N, 6.00% $C_{29}H_{20}N_2O_4$ requires C, 75.64; H, 4.38; N, 6.08%); $\delta_H$ (300 MHz, $d_6$-$CDCl_3$): 1.20-1.5 (12H, br m), 2.15-2.5 (4H; br m), 6.5 (2H, br s), 6.8 (2H, br s); $M_n$=18x$10^3$ amu; $M_w$=43x$10^3$ amu (using GPC vs. polystyrene standards); Surface area (powder, $N_2$ adsorption, BET calculation)=752 $m^2$ $g^{-1}$.

EXAMPLE 11

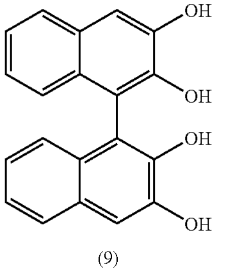

(9)

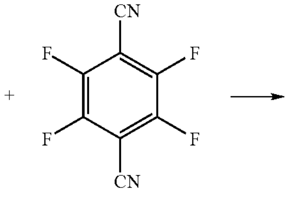

(3)

-continued

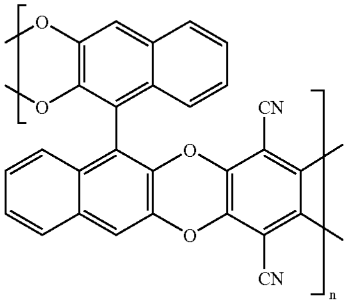

(76)

A mixture of anhydrous potassium carbonate, 2,2',3,3'-tetrahydroxy-1,1-binaphthyl (9; 1.61 g, 5.0 mmol) and 2,3,5,6-tetrafluoroterephthalonitrile (3; 1.01 g, 5.0 mmol) in dry DMF (100 mL) was stirred at 80° C. for 72 h. On cooling, the mixture was added to water (150 mL) and the crude product collected by filtration. Repeated reprecipitations from methanol gave 1.8 g (85%, yield) of fluorescent yellow/green polymer 76. (Found C, 74.57; H, 2.0; N, 6.16% $C_{28}H_{10}N_2O_4$ requires C, 76.71; H, 2.30; N, 6.39%); $\delta_H$ (300 MHz, $d_6$-$CDCl_3$): 7.0-8.0 (10H, br m); $M_n$=3x$10^3$ amu; $M_w$=6x$10^3$ amu (using GPC vs. polystyrene standards); Surface area (powder, $N_2$ adsorption, BET calculation)=440 $m^2$ $g^{-1}$.

EXAMPLE 12

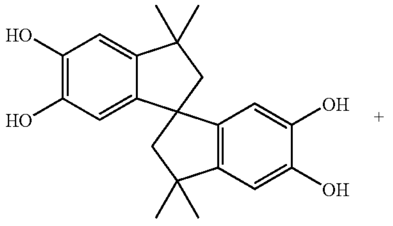

(2)

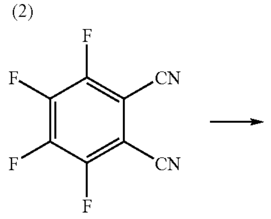

(21)

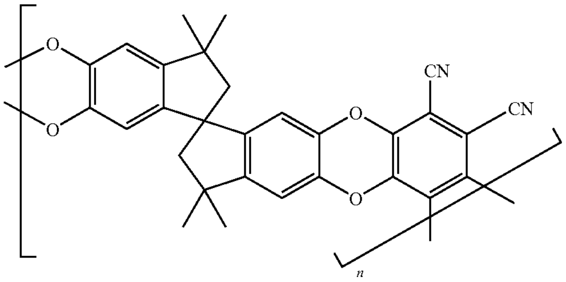

(77)

A mixture of anhydrous potassium carbonate, 3,3,3',3'-tetramethyl-1,1"-spirobisindane-5,5',6,6'-tetrol (2; 1.38 g, 4.05 mmol) and 3,4,5,6-tetrafluorophthalonitrile (21; 0.81 g, 4.05 mmol) in dry DMF (100 mL) was stirred at 75° C. for 72 h. On cooling, the mixture was added to water (150 mL) and the crude product collected by filtration. Repeated reprecipitations from methanol gave 1.49 g (85%, yield) of fluorescent yellow polymer 77. (Found C, 74.30; H, 4.43; N, 6.00% $C_{29}H_{20}N_2O_4$ requires C, 75.64; H, 4.38; N, 6.08%); $\delta_H$ (300 MHz, $d_6$-$CDCl_3$): 1.20-1.5 (12H, br m), 2.15-2.5 (4H, br m), 6.5 (2H, br s), 6.8 (2H, br s); $M_n$=45×10$^3$ amu; $M_w$=70×10$^3$ amu (using GPC vs. polystyrene standards); Surface area (powder, $N_2$) adsorption, BET calculation)=650 m$^2$ g$^{-1}$.

EXAMPLE 13

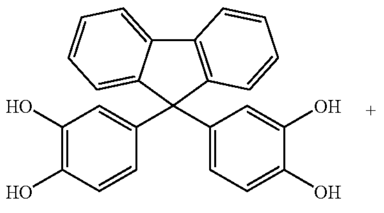

(4)

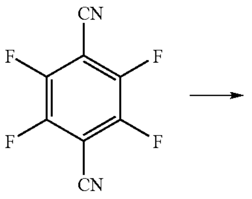

(3)

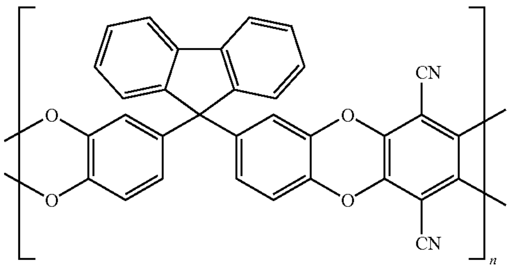

(78)

A mixture of anhydrous potassium carbonate, 9,9-bis(3,4-dihydroxyphenyl)fluorene (4; 0.5 g, 1.3 mmol) and 2,3,5,6-tetrafluoroterephthalonitrile (3; 0.26 g, 1.3 mmol) in dry DMF (50 mL) was stirred at 80° C. for 72 h. On cooling, the mixture was added to water (100 mL) and the crude product collected by filtration. Repeated reprecipitations from methanol gave 0.45 g (70%, yield) of fluorescent yellow polymer 78. $M_n$=3×10$^3$ amu; $M_w$=4×10$^3$ amu (using GPC vs. polystyrene standards); Surface area (powder, $N_2$ adsorption, BET calculation)=440 m$^2$ g$^{-1}$.

EXAMPLE 14

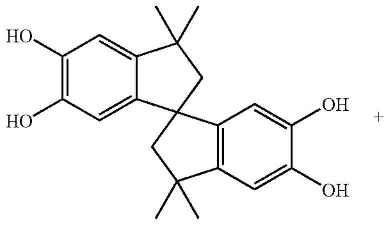

(2)

-continued

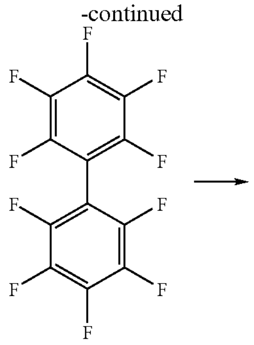

(33)

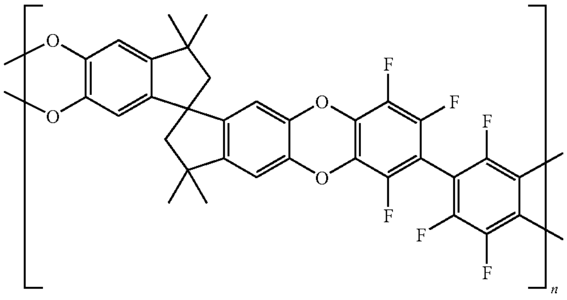

(79)

A mixture of anhydrous potassium carbonate, 3,3,3',3'-tetramethyl-1,1"-spirobisindane-5,5',6,6'-tetrol (2; 1.02 g, 3.0 mmol) and 2,2',3,3',4,4',5,5',6,6'-decafluorobiphenyl (33; 1.00 g, 3.0 mmol) in dry DMF (100 mL) was stirred at 60° C. for 48 h. On cooling, the mixture was added to water (300 mL) and the crude product collected by filtration. Repeated reprecipitations from methanol and acetone gave 1.3 g (73%, yield) of white polymer 79. (Found C, 65.15; H, 3.13; F, 20.98% $C_{33}H_{20}F_6O_4$ requires C, 66.67; H, 3.39; F, 19.17%); $\delta_H$ (300 MHz, $d_6$-$CDCl_3$): 1.20-1.5 (12H, br m), 2.15-2.5 (4H, br m), 6.5 (2H, br s), 6.8 (2H, br s) $M_n$=9×10$^3$ amu; $M_w$=36×10$^3$ amu (using GPC vs. polystyrene standards); Surface area (powder, $N_2$ adsorption, BET calculation)=602 m$^2$ g$^{-1}$.

EXAMPLE 15

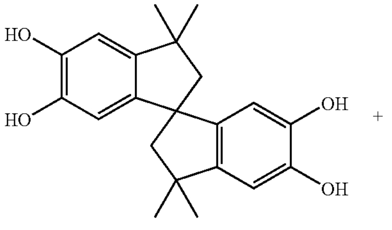

(2)

-continued

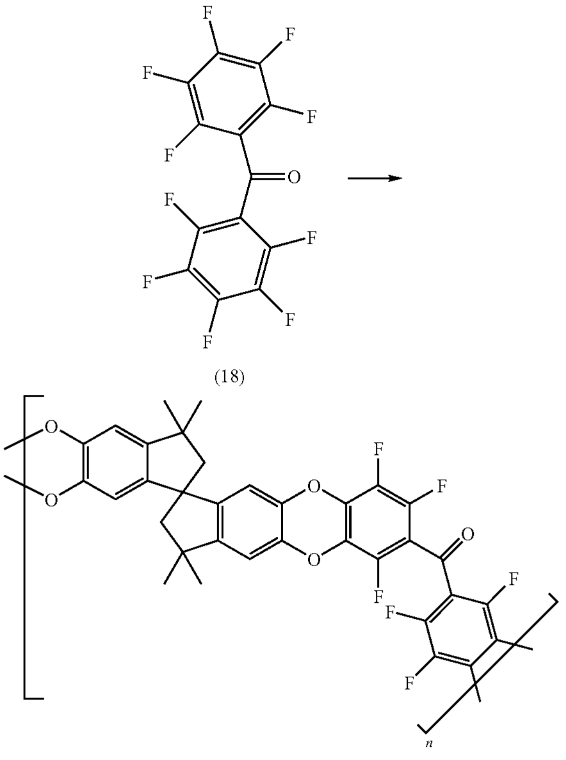

(18)

(80)

A mixture of anhydrous potassium carbonate, 3,3,3',3'-tetramethyl-1,1"-spirobisindane-5,5',6,6'-tetrol (2; 1.02 g, 3.0 mmol) and 2,2',3,3',4,4',5,5',6,6'-decafluorobenzophenone (18; 1.09 g, 3.0 mmol) in dry DMF (100 mL) was stirred at 75° C. for 100 h. On cooling, the mixture was added to water (300 mL) and the crude product collected by filtration. Repeated reprecipitations from methanol and acetone gave 1.52 g (80%, yield) of white polymer 80. (Found C, 65.61; H, 3.33; F, 17.78% $C_{34}H_{20}F_6O_5$ requires C, 65.60; H, 3.24; F, 18.31%); $\delta_H$ (300 MHz, $d_6$-$CDCl_3$): 1.20-1.5 (12H, br m), 2.15-2.5 (4H, br m), 6.5 (2H, br s), 6.8 (2H, br s); $M_n$=62×10$^3$ amu; $M_w$=157×10$^3$ amu (using GPC vs. polystyrene standards); Surface area (powder, $N_2$ adsorption, BET calculation)=562 m$^2$ g$^{-1}$.

EXAMPLE 16

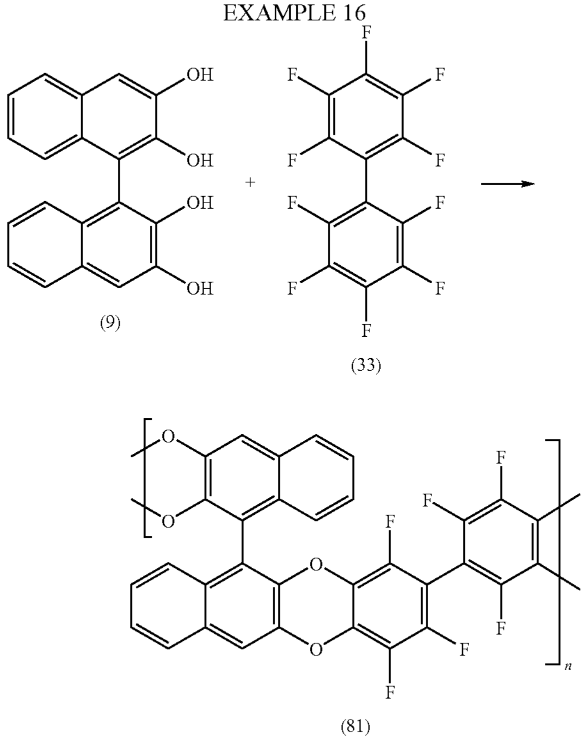

(9)

(33)

(81)

A mixture of anhydrous potassium carbonate, 2,2',3,3'-tetrahydroxy-1,1-binaphthyl (9; 1.43 g, 4.5 mmol) and 2,2',3,3',4,4',5,5',6,6'-decafluorobiphenyl (33; 1.50 g, 4.5 mmol) in dry DMF (100 mL) was stirred at 50° C. for 96 h. On cooling, the mixture was added to water (400 mL) and the crude product collected by filtration. Repeated reprecipitations from methanol and acetone gave 1.75 g (68%, yield) of white polymer 81. (Found C, 65.75; H, 1.81; F, 20.6% $C_{32}H_{10}F_6O_4$ requires C, 67.14; H, 1.76; F, 19.19%); $\delta_H$ (300 MHz, $d_6$-$CDCl_3$): 7.0-8.0 (10H, br m); $M_n$=8×10$^3$ amu; $M_w$=15×10$^3$ amu (using GPC vs. polystyrene standards); Surface area (powder, $N_2$ adsorption, BET calculation)=535 m$^2$ g$^{-1}$.

EXAMPLE 17

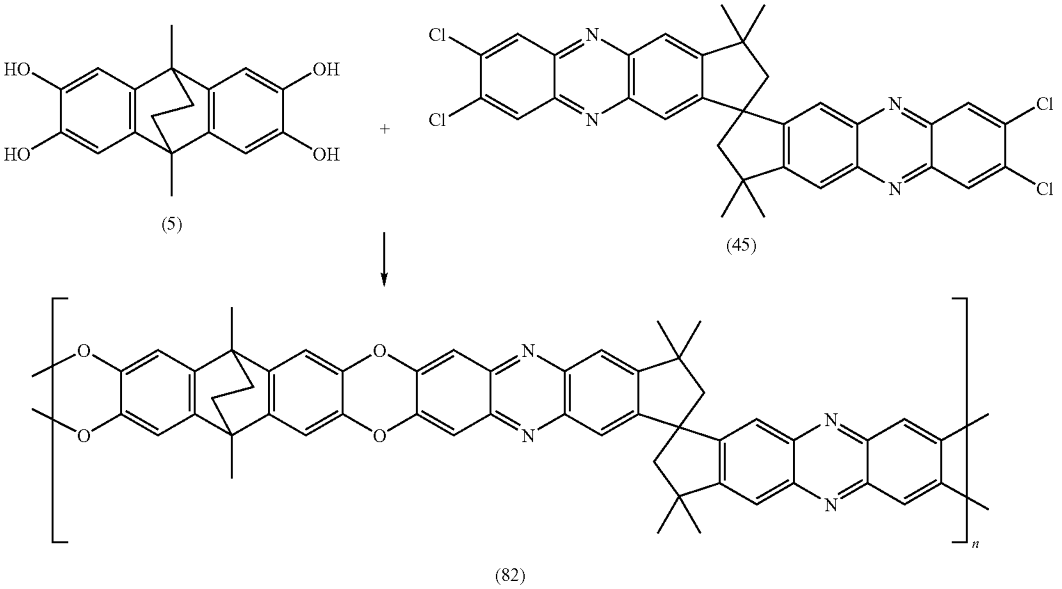

(5)

(45)

(82)

A mixture of anhydrous potassium carbonate, 9,10-ethenо-3,4,6,7-tetrahydroxy-9,10-dimethyl-9,10-dihydroanthracene (5; 0.57 g, 1.9 mmol) and monomer 45 (1.17 g, 1.9 mmol) in dry DMF (70 mL) was stirred at 120° C. for 72 h. On cooling, the mixture was added to water (300 mL) and the crude product collected by filtration. Repeated reprecipitations from methanol, acetone and THF gave 1.1 g (75%, yield) of a yellow polymer 82. (Found C, 76.55; H, 4.85; N, 7.12; Cl, 1.23% $C_{51}H_{38}N_4O_4$ requires C, 79.46; H, 4.97; N, 7.27; Cl, 0.00%); $\delta_H$ (300 MHz, $d_6$-$CDCl_3$): 1.4-2.0 (22H, br m), 2.69 (4H, br s), 6.97 (4H, br s), 7.42 (2H, br s), 7.56 (4H, br s), 7.97 (2H, br s); $M_n$=8×10$^3$ amu; $M_w$=16×10$^3$ amu (using GPC vs. polystyrene standards); Surface area (powder, $N_2$ adsorption, BET calculation)=662 m$^2$ g$^{-1}$.

EXAMPLE 18

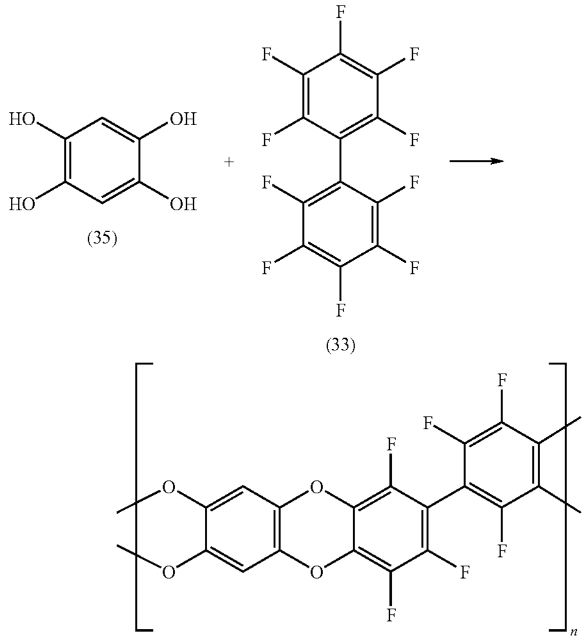

(35) (33)

(83)

A mixture of anhydrous potassium carbonate, 1,2,3,4-tetrahydroxybenzene (34; 0.40 g, 2.79 mmol )and 2,2',3,3',4,4',5,5',6,6'-decafluorobiphenyl (33; 0.932 g, 2.79 mmol) in dry DMF (80 mL) was stirred at 70° C. for 48 h. On cooling, the mixture was added to water (300 mL) and the crude product collected by filtration. The polymer was washed in boiling MeOH, acetone and THF to give 0.96 g (87%, yield) of white polymer 83. (Found C, 51.51; H, 0.52; F, 30.90% $C_{18}H_{22}F_6O_4$ requires C, 54.57; H, 0.51; F, 28.77%); which proved insoluble in all solvents. Surface area (powder, $N_2$ adsorption, BET calculation)=430 m$^2$ g$^{-1}$.

The invention claimed is:

1. A microporous material which is a non-network polymer having a chain comprised of repeating units bonded to each other and each including a first generally planar species and a rigid linker, said linker having a point of contortion such that two adjacent first planar species connected by a rigid linker are held in a non-coplanar orientation, said rigid linker further being such that the polymer chain has a rigid contorted structure, and the polymer being such that said repeating units comprised of the first generally planar species and the rigid linker are bonded predominately to two other such repeating units.

2. A microporous material which is a non-network polymer having a chain comprised of repeating units bonded to each other and each including a first generally planar species and a rigid linker, said linker having a point of contortion such that two adjacent first planar species connected by a rigid linker are held in a non-coplanar orientation, said rigid linker further being such that the polymer chain has a rigid contorted structure, and the polymer being such that said repeating units comprised of the first generally planar species and the rigid linker are bonded predominately to two other such repeating units, wherein the rigid linker contains a site of contortion provided by a spiro group, a bridged ring moiety, a sterically congested single covalent bond around which there is restricted rotation or a tetraphenyl methyl moiety.

3. A microporous material according to claim 1 wherein the point of contortion in the rigid linker is provided by a substituted or unsubstituted spiro-indane, bicyclo-octane, biphenyl or binaphthyl moiety.

4. A microporous material according to claim 3 wherein the point of contortion is provided by a spiro-indane moiety and the rigid linker contains the following structural unit that can be substituted or unsubstituted:

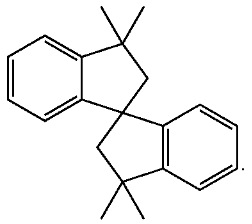

5. A microporous material according to claim 3 wherein the point of contortion is provided by a bicyclo-octane moiety and the rigid linker contains the following structural unit that can be substituted or unsubstituted:

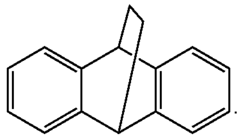

6. A microporous material according to claim 1 wherein the rigid linker contains the following structural unit wherein at least R Group is present to restrict rotation:

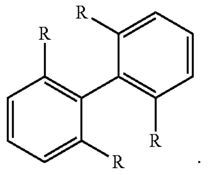

7. A microporous material as claimed in claim 1 wherein each of the first planar species comprises at least one aromatic ring.

8. A microporous material as claimed in claim 7 wherein each of the first planar species comprises a substituted or unsubstituted moiety of the formula:

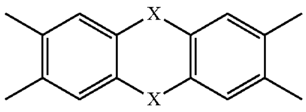

where X is O, S or NH.

9. A micorporous material as claimed in claim 1 which comprises repeating units of formula:

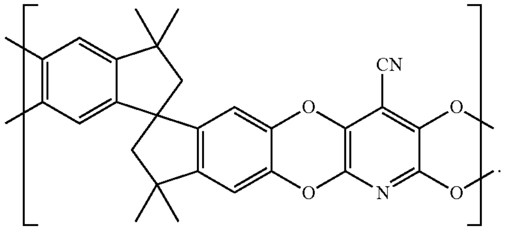

10. A micorporous material as claimed in claim 1 which comprises repeating units of formula:

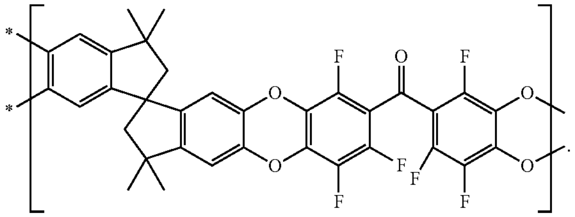

11. A micorporous material as claimed in claim 1 which comprises repeating units of formula:

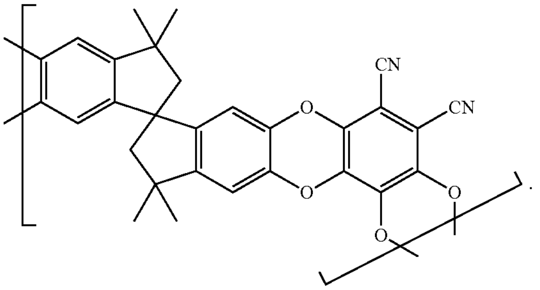

12. A microporous material as claimed in claim 1 which comprises repeating units of formula:

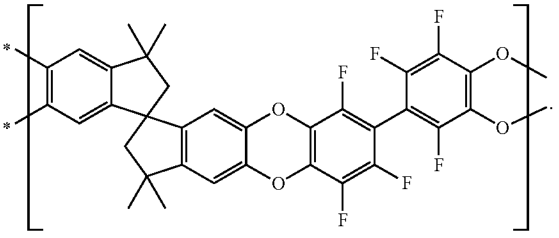

13. A micorporous material as claimed in claim 1 which comprises repeating units of formula:

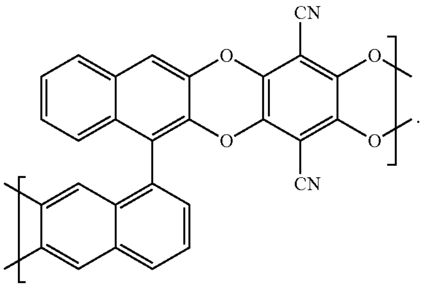

14. A microporous material as claimed in claim 1 which is a product of the hydrolysis of nitrile substituents in a polymer which comprises repeating units of formula:

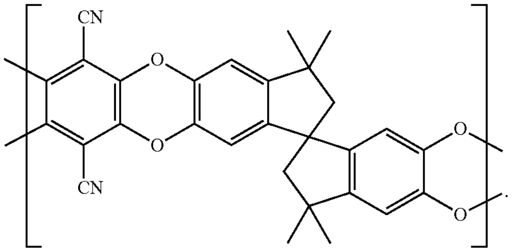

15. A microporous material as claimed in claim 14 which comprises repeating units of formula:

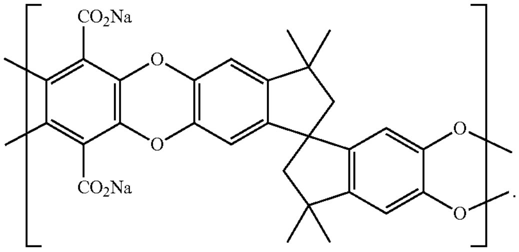

16. A microporous material according to claim 1 wherein the polymer is comprised of at least 70% by mole of the repeating unit.

17. A microporous material according to claim 16 wherein the polymer is comprised of at least 80% by mole of the repeating unit.

18. A microporous material according to claim 17 wherein the polymer is comprised of at least 90% by mole of the repeating unit.

19. A microporous material according to claim 1, wherein the material has a surface area of at least 300 $m^2$ $g^{-1}$.

20. A microporous material according to claim 1, wherein the material has an average pore diameter of less than 100 nm.

21. A microporous material according to claim 1, wherein the material has a number average mass in the range $1\times10^3$ to $1000\times10^3$ amu compared to polystyrene standards.

22. A method of producing a microporous material according to claim 2 comprising reacting a first monomer unit having a site of contortion provided by a spiro group, a bridged ring moiety, a sterically congested single covalent bond around which there is restricted rotation, or a tetraphenyl methyl moiety with a pair of second generally planar monomer units.

23. A membrane comprised of a microporous material according to claim 1.

24. A membrane according to claim 22, wherein the membrane has a thickness which is less than or equal to 2 mm.

25. A membrane according to claim 24, wherein the membrane includes an additional entity selected from the group consisting of a catalyst species, an organometallic species, an inorganic species, at least one type of metal ion; and at least one type of metal particle.

26. A method for enriching a first species in a first mixture of said first species and a second species, the method comprising the steps of: i) applying the first mixture to one side of a membrane in accordance with claim 23; ii) causing the first mixture to pass through the membrane; and iii) collecting a second mixture of the first and second species, which is enriched in respect of the first species compared to the first mixture, from an opposite side of the membrane.

27. A catalyst system comprising a catalytic species and a microporous material according to claim 1.

28. A tissue support comprising a microporous material according to claim 1.

29. A molecular sensor comprising a microporous material according to claim 1.

30. An opto-electronic material comprising a microporous material according to claim 1.

* * * * *